US012530433B1

(12) United States Patent
Tabak et al.

(10) Patent No.: US 12,530,433 B1
(45) Date of Patent: Jan. 20, 2026

(54) ROBUST RECORD-TO-EVENT CONVERSION SYSTEM

(71) Applicant: Citibank, N.A., New York, NY (US)

(72) Inventors: Tom Tabak, Tel Aviv (IL); Matthew Joseph Moffat, London (GB)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/300,664

(22) Filed: Aug. 14, 2025

(51) Int. Cl.
*G06F 18/22* (2023.01)
*G06F 16/22* (2019.01)
*G06N 3/0475* (2023.01)

(52) U.S. Cl.
CPC .......... *G06F 18/22* (2023.01); *G06F 16/2237* (2019.01); *G06N 3/0475* (2023.01)

(58) Field of Classification Search
CPC .... G06F 18/22; G06F 16/2237; G06N 3/0475
See application file for complete search history.

(56) References Cited

U.S. PATENT DOCUMENTS 11,520,774 B1 * 12/2022 Sun .................. G06F 16/245
2021/0149748 A1 * 5/2021 Abolhassani ........... G06F 18/29

* cited by examiner

*Primary Examiner* — Loc Tran
(74) *Attorney, Agent, or Firm* — Perkins Coie LLP

(57) ABSTRACT

Systems and methods are disclosed comprising techniques for record-to-event conversion, such as retrieving at least one alphanumeric record associated with a monitored digital communication transmitted among two or more users, generating a time-enumerated data structure that stores an event entry set for the monitored digital communication, selectively identifying at least one discrete event for the monitored digital communication, generating one or more relevance scores for the at least one discrete event, identifying at least one valid discrete event from the at least one discrete event, generating an event attribute set for the at least one valid discrete event, updating the normalized event attribute set for a new event entry within the event entry set of the time-enumerated data structure, and transmitting the updated time-enumerated data structure within an elapsed duration after retrieving the at least one alphanumeric record.

20 Claims, 19 Drawing Sheets

| Event Start Time | Event End Time | Event Type | Relevant / Valid? |
|---|---|---|---|
| 00:01 | 00:19 | Type A | Yes |
| 00:20 | 00:55 | Type B | Yes |
| 00:56 | 01:22 | Type C | No |

FIG. 5B

| ID 631 | Date 632 | Timestamp 633 | Initiator 634 | Size 635 | Action 636 | Status 637 | Quantity 638 |
|---|---|---|---|---|---|---|---|
| 1 | · | 15:43:18 | Client | 2 Liters | Bid | New Order | 2207.30 |
| 2 | · | 15:43:57 | Sales | 2 Liters | Sell | New Order | 2210.25 |
| 3 | · | 15:43:57 | Sales | 2 Liters | Mid | New Order | 2208.75 |
| N | · | 15:44:32 | Client | 1 Liter | Bid | New Order | 2209.20 |

Normalized Event Attributes 630

Event Entries 314

ROBUST RECORD-TO-EVENT CONVERSION SYSTEM

CROSS-REFERENCE TO RELATED APPLICATIONS

This application is related to U.S. patent application Ser. No. 19/300,640 entitled "ROBUST RECORD-TO-EVENT CONVERSION SYSTEM," filed on Aug. 14, 2025, and it is further related to U.S. patent application Ser. No. 19/300,652 entitled "ROBUST RECORD-TO-EVENT CONVERSION SYSTEM," filed on Aug. 14, 2025. The content of the foregoing applications is incorporated herein by reference in its entirety.

Record management systems play a crucial role in organizing and maintaining information across various industries and sectors. These systems are designed to capture, store, and retrieve records efficiently, ensuring that important data is accessible when needed. As organizations generate and handle increasing volumes of data, the complexity of managing records has grown substantially.

Traditional record management approaches often face challenges in dealing with the diverse types of records encountered in modern business environments. These may include digital documents, physical files, audio recordings, and various other formats. Additionally, the need for accurate and timely extraction of relevant information from these records has become more pronounced, particularly in fields such as finance, healthcare, and legal services. Improving the efficiency and accuracy of record management processes can potentially lead to enhanced decision-making, regulatory compliance, and operational effectiveness for organizations.

BRIEF DESCRIPTION OF THE DRAWINGS

Detailed descriptions of implementations of the present invention will be described and explained through the use of the accompanying drawings.

FIGS. 5A-5B are block diagrams that illustrate an example implementation of a record conversion system for processing of diarized signal sequences and a time-enumerated data structure in accordance with some implementations of the disclosed technology.

FIGS. 6A-6B are block diagrams that illustrate an example implementation of a record conversion system for converting communication records to event entries and a time-enumerated data structure in accordance with some implementations of the disclosed technology.

Figure 1:
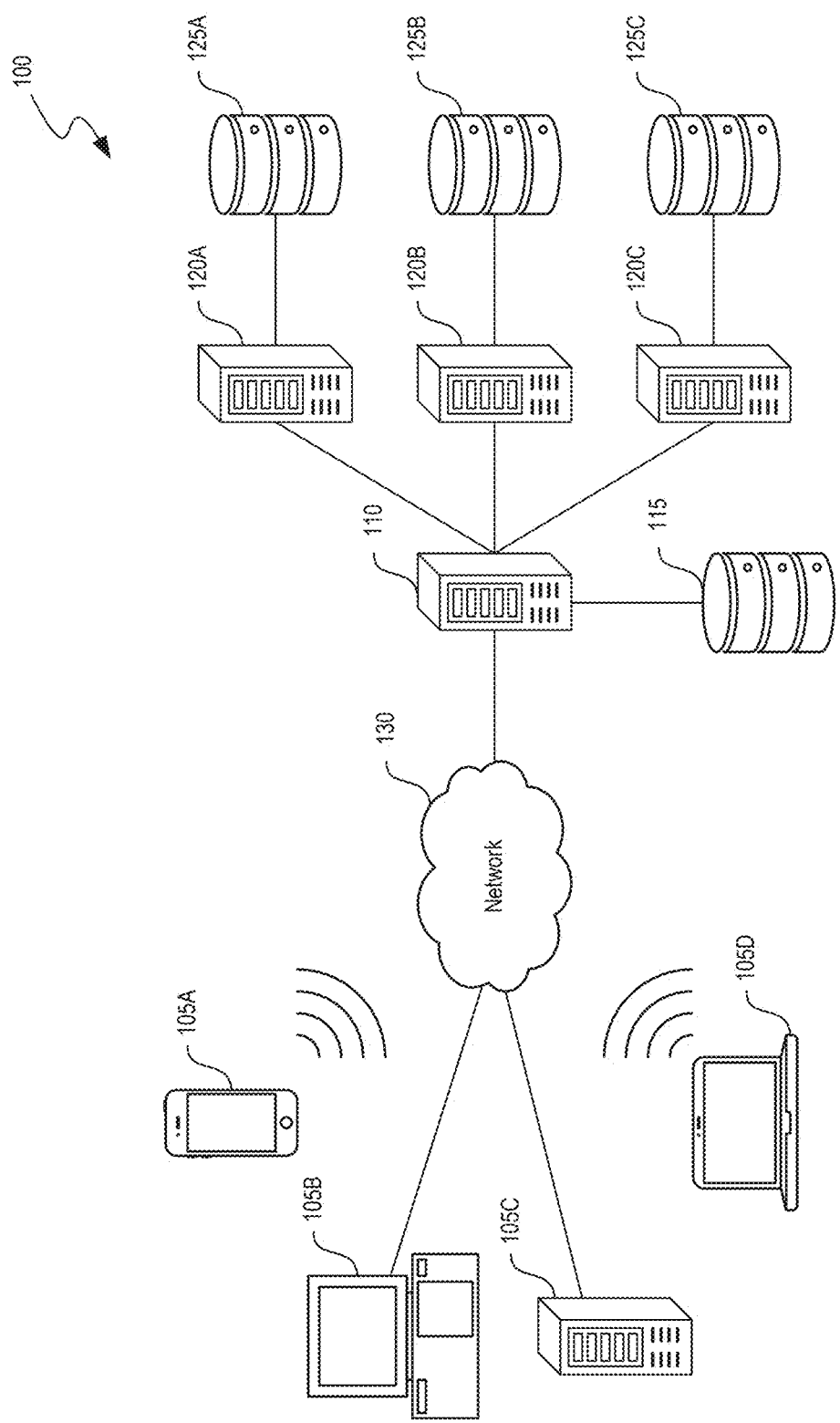
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional record management systems face significant challenges in efficiently converting unstructured digital communications (e.g., chat messages, audio transcripts, and real-time conversations) into structured, actionable event data suitable for systematic analysis and processing. This problem is particularly acute in time-sensitive environments where rapid data extraction and normalization are critical (e.g., regulatory compliance scenarios, financial trading operations, emergency response coordination). The sheer volume and velocity of digital communications in modern business environments exacerbate these challenges, making it increasingly difficult for conventional systems to keep pace with the influx of unstructured data.

Furthermore, the complexity and variability of human communication patterns pose substantial obstacles to automated data extraction and categorization. Natural language often comprises context-dependent information, implicit references, and domain-specific jargon that traditional rule-based systems struggle to interpret accurately. This complexity is compounded in multi-party conversations where topic shifts, interruptions, and non-linear dialogue flows are common. As a result, valuable information embedded within these communications often remains untapped or is processed with significant delays, hindering organizations' ability to make timely decisions and maintain regulatory compliance.

Contemporary systems exhibit several critical shortcomings in addressing these challenges. Existing solutions often lack the ability to automatically identify discrete events within continuous communication streams, failing to distinguish between relevant transactional information and extraneous dialogue. This limitation results in either over-capture of irrelevant data or under-capture of critical events, both of which impede efficient data processing and analysis. Additionally, current systems frequently struggle to extract relevant contextual information with high accuracy, particularly when dealing with domain-specific terminology or complex relational data (e.g., multi-leg financial transactions, hierarchical organizational structures).

Moreover, many existing platforms are unable to perform real-time conversion of alphanumeric signal data into normalized, time-enumerated data structures suitable for business intelligence and compliance monitoring. This deficiency creates significant latency between the occurrence of communication events and their availability for analysis, potentially leading to missed opportunities or delayed regulatory responses. The inability to rapidly transform unstructured communications into standardized, machine-readable formats also hampers integration with downstream analytics tools and automated decision-making systems, limiting the overall effectiveness of data-driven operations.

The disclosed system can address these challenges by leveraging advanced natural language processing (NLP) techniques and specialized generative artificial intelligence (AI) models to automatically detect, classify, and convert communication records into standardized event entries within time-enumerated data structures. For example, the system can employ a multi-stage processing pipeline that begins with the retrieval of alphanumeric record sets associated with monitored digital communications transmitted among users. The system can then generate a time-enumerated data structure based on an event definition schema, providing a framework for organizing and normalizing event data extracted from the communications.

Further, the system can utilize a first generative AI model to identify discrete events within the diarized sequences of timestamped alphanumeric signal data. This model can be trained to recognize patterns and contextual cues that signify the beginning and end of distinct events, even within continuous streams of communication. The system can then employ a second generative AI model to extract relevant event attributes from the identified discrete events, mapping them to a normalized event attribute set within the time-enumerated data structure.

The system can implement a sophisticated evaluation mechanism to ensure the accuracy and reliability of the extracted event data. For example, the system can compare the generated event entries against a ground truth dataset, utilizing advanced similarity scoring techniques and Hungarian algorithms to identify matching events and calculate key performance metrics. This evaluation process can enable the system to continuously refine and improve its event detection and attribute extraction capabilities, adapting to new communication patterns and evolving business requirements.

Moreover, the system can incorporate real-time processing capabilities, allowing for the rapid conversion of incoming digital communications into structured event data. The system can achieve this by implementing parallel processing techniques and optimized data structures that enable efficient handling of high-volume, high-velocity communication streams. This real-time processing capability can be particularly valuable in scenarios requiring immediate action or decision-making based on communication events (e.g., financial trading, customer service interactions, or emergency response coordination).

For illustrative purposes, examples are described herein in the context of computer systems for regulatory compliance monitoring in financial institutions. However, a person skilled in the art will appreciate that the disclosed system can be applied in other contexts. For example, the disclosed system can be used within a healthcare environment to automatically extract and structure patient information from diverse communication channels (e.g., electronic health records, telemedicine consultations, and interdepartmental communications), enabling more efficient care coordination and compliance with healthcare regulations. Additionally, the system can be applied in the field of customer relationship management (CRM) to analyze customer interactions across multiple touchpoints, providing businesses with actionable insights for improving customer satisfaction and personalizing service delivery.

Development of a system architecture for automated extraction and structuring of event data from unstructured digital communications presented substantial technical challenges when compared to conventional approaches. Implementation of such a computational platform necessitated addressing fundamental limitations in existing natural language processing and event detection methodologies, particularly regarding the accurate identification of discrete events within continuous communication streams and the extraction of relevant attributes in standardized data formats. Conventional text analysis frameworks demonstrated insufficient capability to process the contextual nuances and domain-specific terminology prevalent in technical communications.

Traditional computational approaches utilize predefined lexical patterns and static parsing algorithms, which exhibit limited adaptability to the dynamic characteristics of human-generated textual exchanges. For instance, conventional systems may encounter difficulties differentiating between different types of technical requests and confirmations, and may fail to accurately extract critical data elements such as numerical parameters or technical specifications when expressed in non-standardized formats. Existing methodologies typically require manual annotation and rule configuration for each domain or communication protocol, resulting in resource-intensive processes that do not scale efficiently across diverse communication channels. In contrast, the disclosed system architecture implements advanced natural language processing algorithms and specialized machine learning models to dynamically identify and extract relevant event information across multiple domains and communication modalities.

Furthermore, integration of the extracted event data with existing record management systems presented additional technical challenges, as legacy systems frequently operate with structured input formats and predefined event taxonomies. These established record management architectures often lack the necessary flexibility to process the diverse range of event attributes and temporal relationships identified by advanced extraction systems. Successful integration between legacy infrastructures and modern event extraction capabilities requires consideration of multiple technical factors, including data format compatibility, real-time processing requirements, and maintenance of data integrity standards.

To address these technical challenges, a systematic evaluation of multiple architectural approaches was conducted. This evaluation included experimental implementation of various natural language processing methodologies, encompassing rule-based systems, statistical models, and neural network architectures, to determine the most effective computational approach for event detection and attribute extraction. Additionally, diverse strategies for processing contextual and temporal relationships within communications were analyzed, enabling the development of a more robust system architecture capable of accurately identifying and correlating related events across non-sequential segments of communication data.

Implementation of purely rule-based systems for event detection demonstrated insufficient flexibility, as these systems failed to adapt to the diverse linguistic patterns used to express similar concepts, resulting in suboptimal recall and precision metrics in event identification. For example, when testing rule-based approaches on technical support chat data, the system struggled to recognize variations in how users expressed assistance requests. Similarly, conventional sequence labeling algorithms did not adequately capture the long-range dependencies, and contextual nuances present in complex technical communications. In practical testing, these algorithms frequently missed connections between an initial inquiry and a subsequent resolution confirmation occurring several messages later, especially when intervening messages comprised unrelated topics. Furthermore, generic pre-trained language models without domain-specific optimization failed to leverage specialized technical terminology, resulting in classification errors and inaccurate attribute extraction.

Consequently, experimental implementations of various methodologies for combining machine learning models with domain-specific knowledge bases were conducted. These experiments included testing different architectural configurations for integrating pre-trained language models with specialized classification layers and attribute extraction modules to identify optimal computational approaches. For example, one experimental configuration involved a two-stage architecture where a base transformer model processed raw communication text, followed by domain-specific attention mechanisms that focused on technical terminology and numerical expressions. This approach demonstrated significant improvements in identifying system-related events compared to single-stage models. Another experimental implementation utilized sliding window techniques with overlapping segments to process long chat histories, which helped maintain contextual continuity across message boundaries. Additionally, systematic evaluation of different strategies for incorporating domain knowledge into the event detection and attribute extraction processes was performed. This evaluation included analysis of various methods for leveraging technical ontologies and taxonomies within the model architecture, such as utilizing these knowledge structures to guide attention mechanisms or as supplementary input features to neural network components. In practical testing, augmenting the input embeddings with domain-specific entity tags (e.g., marking system components, error codes, and configuration parameters) before processing through the neural network substantially improved extraction accuracy for technical parameters. Experiments with different tokenization strategies revealed that component tokenization methods specifically tuned to technical terminology reduced out-of-vocabulary issues when processing specialized jargon and alphanumeric system identifiers.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, environment 100 includes one or more client computing devices 105A-D, examples of which can host the record conversion system 200 of FIG. 2. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, servers 110 and 120, or associated computing devices, comprise computing systems, such as the record conversion system 200 of FIG. 2. Though each server 110 and 120, or associated computing device, is displayed logically as a single server, server computing devices can each be a distributed computing environment encompassing multiple computing devices located at the same or at geographically disparate physical locations. In some implementations, each server 120 corresponds to a group of servers.

Client computing devices 105 and servers 110 and 120, or associated computing devices, can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Record Conversion System

Figure 2:
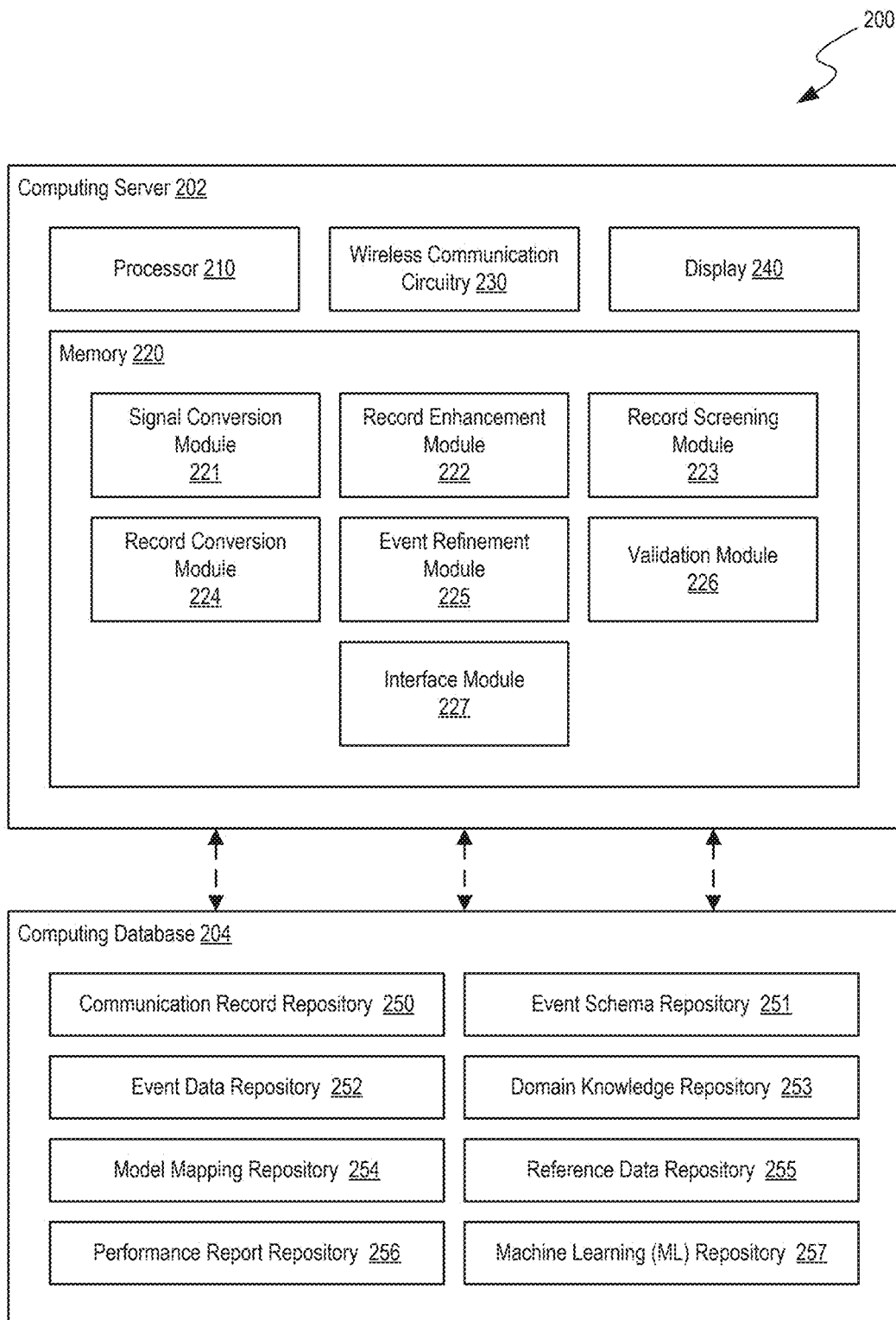
FIG. 2 is a block diagram that illustrates a record conversion system that can implement aspects of the present technology.

FIG. 2 is a block diagram that illustrates a record conversion system 200 ("system 200") that can implement aspects of the present technology. The components shown in FIG. 2 are merely illustrative, and well-known components are omitted for brevity. As shown, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 106 described in reference to FIG. 1. As shown, the computing database 204 can include a communication record repository 250, an event schema repository 251, an event data repository 252, a domain knowledge repository 253, a model mapping repository 254, a reference data repository 255, a performance report repository 256, and a machine learning repository 257.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules.

As shown in FIG. 2, modules of the memory 220 can include a signal conversion module 221, a record enhancement module 222, a record screening module 223, a record conversion module 224, an event refinement module 225, a validation module 226, and an interface module 227. Other implementations of the computing server 202 include additional, fewer, or different modules, or distribute functionality differently between the modules. As used herein, the term "module" and/or "engine" refers broadly to software components, firmware components, and/or hardware components. Accordingly, the module 221-227 can each comprise software, firmware, and/or hardware components implemented in, or accessible to, the computing server 202.

Figure 3:
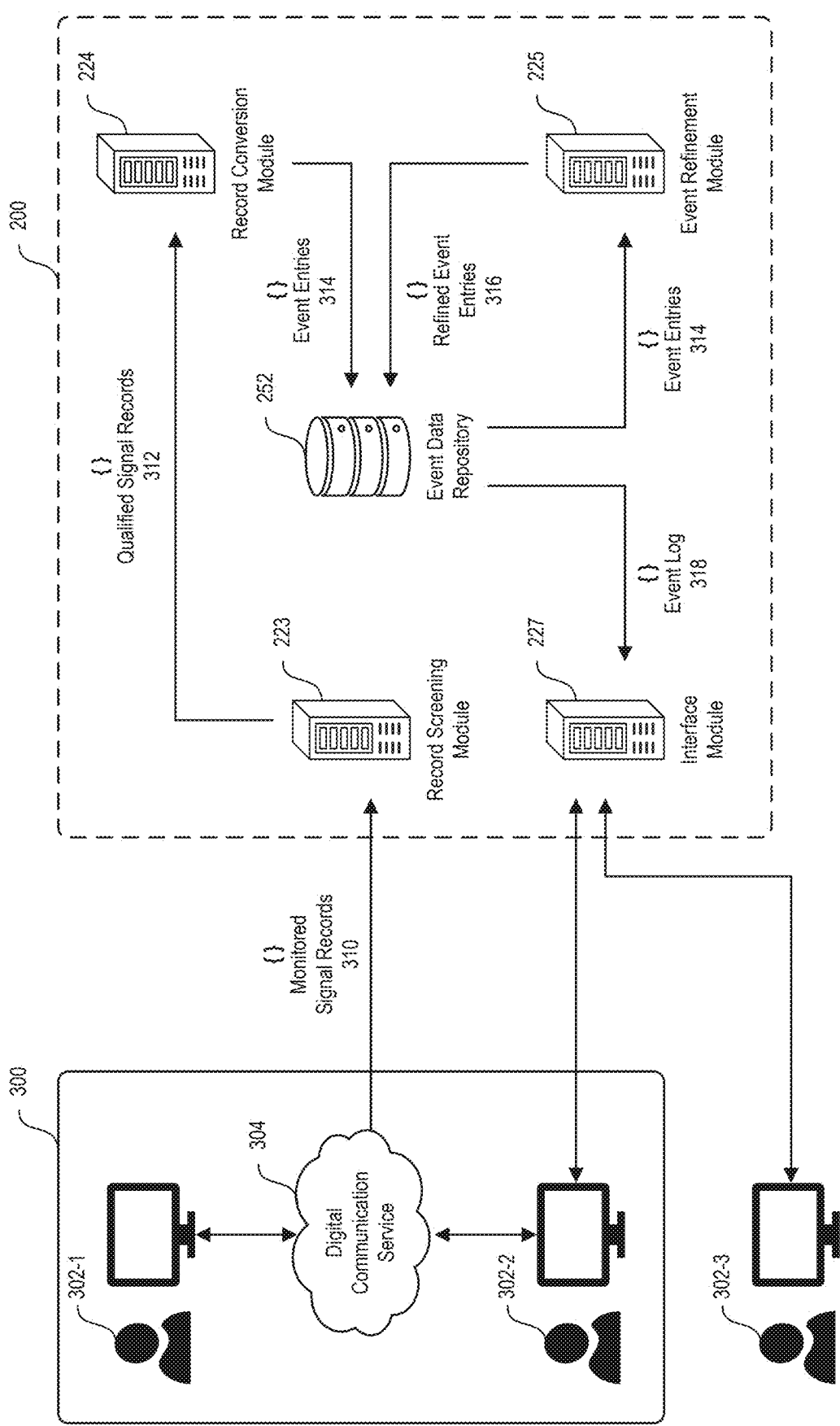
FIG. 3 is a block diagram that illustrates an example implementation of a record conversion system for processing monitored digital communications in accordance with some implementations of the disclosed technology.

FIG. 3 is a block diagram that illustrates an example implementation of a record conversion system for processing monitored digital communications in accordance with some implementations of the disclosed technology. The record conversion system 200 can process a monitored digital communication 300 transmitted among two or more users (e.g., participant user 302-1, participant user 302-2, and/or the like) through a digital communication service 304 (e.g., a chat application, a voice call system, a video conferencing platform, and/or the like). The record conversion system 200 can retrieve an alphanumeric record set associated with the monitored digital communication 300 in contemporaneous time with transmission of the monitored digital communication 300. This contemporaneous retrieval can enable real-time, or near real-time, processing of communication data (e.g., text messages, voice transcripts, and/or the like) as the communication occurs between the users.

In some implementations, the record screening module 223 can process monitored signal records 310 (e.g., raw text data, audio transcripts, metadata, and/or the like) received from the monitored digital communication 300 to generate qualified signal records 312 (e.g., filtered and preprocessed communication data). The record screening module 223 can determine qualified signal records 312 by analyzing the relevancy of contents within the monitored signal records 310 (e.g., using natural language processing techniques, keyword matching algorithms, semantic analysis methods, and/or the like) and discarding records that have little to no relevance (e.g., greetings, small talk, off-topic discussions, and/or the like). This screening process can involve multiple steps, such as tokenization of the input text, removal of stop words, stemming or lemmatization of words, and application of relevance scoring algorithms (e.g., TF-IDF, cosine similarity, and/or the like) to determine which portions of the communication are pertinent to event detection.

In some implementations, the record conversion module 224 can process the qualified signal records 312 to generate event entries 314 (e.g., structured data representations of communication events). The record conversion module 224 can employ various natural language processing and machine learning techniques (e.g., named entity recognition, relation extraction, sequence labeling, and/or the like) to identify and extract relevant information from the qualified signal records 312. This process can involve parsing the text to identify key entities (e.g., product names, quantities, prices, and/or the like), recognizing temporal expressions to determine event timestamps, and classifying the type of event (e.g., order placement, quote request, trade confirmation, and/or the like) based on the context and content of the communication.

In some implementations, the event refinement module 225 can process the event entries 314 to produce refined event entries 316 (e.g., normalized and enriched event data). The event refinement module 225 can perform various data cleaning and enrichment tasks (e.g., standardizing formats, resolving ambiguities, adding contextual information, and/or the like) to improve the quality and consistency of the event data. This refinement process can involve steps such as date and time normalization to a standard format, currency conversion to a common unit, resolution of abbreviations or acronyms to their full forms, and augmentation of event data with additional relevant information from external sources (e.g., current market prices, company information, and/or the like).

In some implementations, the interface module 227 can facilitate communication and data transfer between various components of the record conversion system 200 (e.g., the record screening module 223, the record conversion module 224, the event refinement module 225, and/or the like) and the event data repository 252. The interface module 227 can manage data flow, handle API calls, ensure proper data formatting for storage and retrieval, and implement security measures (e.g., encryption, access control, and/or the like) to protect sensitive information during data transfer and storage operations.

In some implementations, the event data repository 252 can store the refined event entries 316 (e.g., in a structured database format, as JSON objects, in a distributed file system, and/or the like). The event data repository 252 can organize the stored event data to facilitate efficient querying and retrieval (e.g., using indexing techniques, partitioning strategies, and/or the like) for subsequent analysis or reporting purposes. The stored event entries can form an event log 318 (e.g., a time-enumerated data structure of event entries) that provides a comprehensive record of communication events and their associated attributes.

In some implementations, a user 302-3, who may not be a participant of the monitored digital communication 300, can retrieve and access the event log 318 (e.g., as an authorized user, reviewer, compliance officer, and/or the like). The record conversion system 200 can implement access control mechanisms (e.g., role-based access control, multi-factor authentication, and/or the like) to ensure that only authorized individuals can view or interact with the event log 318. This access can be provided through a secure user interface (e.g., a web portal, a desktop application, a mobile app, and/or the like) that allows the user 302-3 to search, filter, and analyze the event data based on various criteria (e.g., date ranges, event types, participants, and/or the like).

Figure 4:
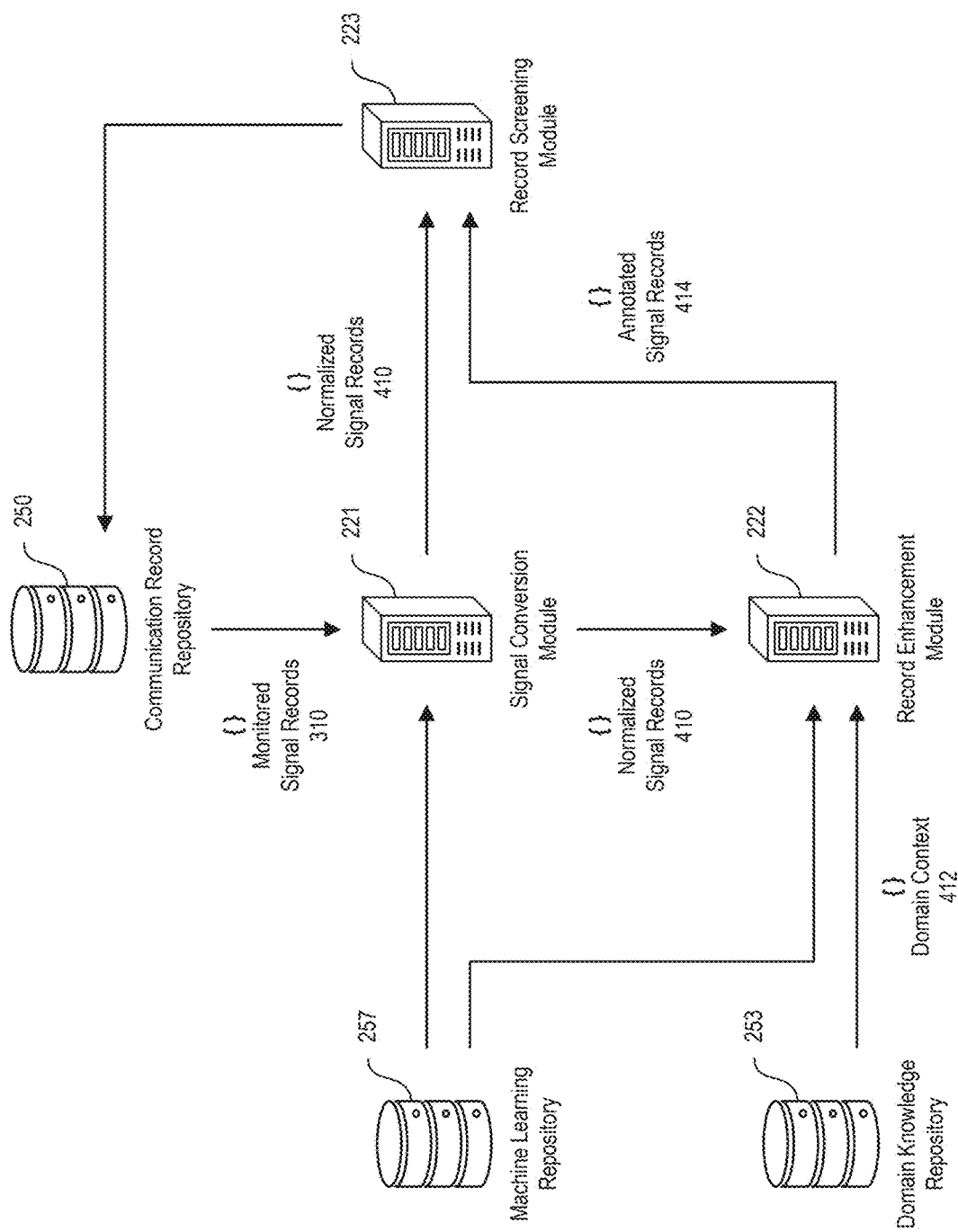
FIG. 4 is a block diagram that illustrates an example implementation of a record conversion system for processing and enhancing communication records in accordance with some implementations of the disclosed technology.

FIG. 4 is a block diagram that illustrates an example implementation of a record conversion system for processing and enhancing communication records in accordance with some implementations of the disclosed technology. In some implementations, the signal conversion module 221 can process the monitored signal records 310 to generate normalized signal records 410. The signal conversion module 221 can employ various natural language processing techniques (e.g., tokenization, lemmatization, part-of-speech tagging, and/or the like) to standardize and structure the raw input data. The signal conversion module 221 can first tokenize the monitored signal records 310 by breaking down the text into individual words or component words (e.g., splitting sentences into words, handling contractions, separating punctuation, and/or the like). The signal conversion module 221 can then apply lemmatization to reduce inflected words to their base or dictionary form (e.g., converting "running" to "run", "better" to "good", and/or the like). The signal conversion module 221 can also perform part-of-speech tagging to assign grammatical categories (e.g., noun, verb, adjective, adverb, and/or the like) to each token. Additionally, the signal conversion module 221 can implement named entity recognition to identify and classify named entities (e.g., person names, organization names, location names, product names, and/or the like) within the text. The signal conversion module 221 can further apply syntactic parsing to analyze the grammatical structure of sentences (e.g., identifying subject-verb-object relationships, prepositional phrases, subordinate clauses, and/or the like). Through these processes, the signal conversion module 221 can transform the unstructured or semi-structured monitored signal records 310 into a more uniform and machine-readable format, facilitating subsequent analysis and processing steps.

In some implementations, the record enhancement module 222 can process the normalized signal records 410 along with domain context 412 to generate annotated signal records 414. The record enhancement module 222 can leverage domain-specific knowledge and contextual information to enrich and augment the normalized data. The record enhancement module 222 can first access the domain knowledge repository 253 to retrieve relevant domain context 412 (e.g., financial terminology, product specifications, market data, regulatory information, and/or the like). The record enhancement module 222 can then apply this domain context 412 to the normalized signal records 410 through various techniques. For example, the record enhancement module 222 can perform entity linking to connect named entities in the text to corresponding entries in a knowledge base (e.g., mapping company names to their stock symbols, product names to their specifications, and/or the like). The record enhancement module 222 can also implement word sense disambiguation to determine the correct meaning of ambiguous terms based on the surrounding context (e.g., distinguishing between "bank" as a financial institution and "bank" as a riverbank). Additionally, the record enhancement module 222 can apply sentiment analysis to gauge the emotional tone or attitude expressed in the text (e.g., identifying positive, negative, or neutral sentiments towards specific entities or events). The record enhancement module 222 can further incorporate temporal reasoning to understand and normalize time-related expressions (e.g., converting relative time references like "next week" to absolute dates). Through these enhancement processes, the record enhancement module 222 can produce annotated signal records 414 that comprise not only the original normalized text but also additional layers of semantic and contextual information, enabling more sophisticated analysis and interpretation of the communication data.

In some implementations, the record screening module 223 can process the normalized signal records 410 to identify and extract relevant information for further analysis. The record screening module 223 can employ various filtering and selection techniques to focus on the most pertinent data within the normalized signal records 410. For example, the record screening module 223 can implement keyword-based filtering to identify records comprising specific terms or phrases of interest (e.g., transaction-related keywords, product names, action verbs indicating trading activities, and/or the like). The record screening module 223 can also apply regular expression patterns to detect and extract structured information (e.g., dates, times, currency amounts, product codes, and/or the like) from the normalized text. Additionally, the record screening module 223 can utilize machine learning-based classification models (e.g., support vector machines, random forests, neural networks, and/or the like) trained on labeled examples to categorize records based on their content and relevance. For example, the record screening module 223 can input discrete signal event records (e.g., time-enumerated plaintext data from audio recording transcripts) into a generative model (e.g., a large language model) to output one or more categorical labels, or quantitative scores, indicating relevance of the individual signal event records. The record screening module 223 can further implement topic modeling techniques (e.g., Latent Dirichlet Allocation, Non-negative Matrix Factorization, and/or the like) to identify underlying themes or subjects within the normalized signal records 410. Through these screening processes, the record screening module 223 can effectively reduce noise and irrelevant information, focusing subsequent processing steps on the most valuable and pertinent data extracted from the original monitored signal records 310.

In some implementations, the communication record repository 250 can store and manage the various stages of processed signal records (e.g., monitored signal records 310, normalized signal records 410, annotated signal records 414, and/or the like). The communication record repository 250 can implement a structured database system (e.g., relational database, document-oriented database, graph database, and/or the like) to efficiently organize and index the stored records. For example, the communication record repository 250 can use a schema design that captures the hierarchical relationship between raw, normalized, and annotated records, allowing for efficient querying and retrieval of records at different processing stages. The communication record repository 250 can also implement versioning mechanisms to track changes and maintain the history of record transformations. Additionally, the communication record repository 250 can employ data compression techniques (e.g., lossless compression algorithms, columnar storage formats, and/or the like) to optimize storage utilization while preserving data integrity. The communication record repository 250 can further implement access control mechanisms (e.g., role-based access control, encryption, and/or the like) to ensure data security and privacy. Through these storage and management capabilities, the communication record repository 250 can provide a centralized and efficient data store for the various components of the record conversion system 200 to access and manipulate communication records throughout the processing pipeline.

In some implementations, the record conversion system 200 can handle multi-leg transactions involving multiple financial products in a single conversation by implementing a hierarchical event detection and extraction approach. The record conversion system 200 can first employ a high-level event detector to identify potential transaction-related segments within the normalized signal records 410. This high-level event detector can utilize techniques such as sliding window analysis and attention mechanisms to scan through the text and identify regions of interest. Once potential transaction segments are identified, the record conversion system 200 can apply more specialized models to extract detailed information about each leg of the transaction. For example, the system can use a combination of sequence labeling models (e.g., conditional random fields, bidirectional LSTMs with CRF layers, and/or the like) to identify and classify entities such as financial products, quantities, prices, and transaction types within each segment. The record conversion system 200 can then employ a relation extraction model (e.g., dependency parsing-based approaches, neural relation extraction models, and/or the like) to determine the relationships between these entities and construct a structured representation of each transaction leg. Finally, the record conversion system 200 can utilize a transaction aggregation module to combine the information from multiple legs into a coherent multi-leg transaction representation, taking into account temporal ordering, dependencies between legs, and overall transaction context. This hierarchical approach allows the record conversion system 200 to handle complex, multi-product transactions while maintaining the ability to process simpler, single-product transactions efficiently.

In some implementations, the event detector of the record conversion system 200 can use chunking techniques to split long chats into overlapping sections before processing. The event detector can first analyze the overall structure of the chat (e.g., message boundaries, timestamps, speaker changes, and/or the like) to identify natural breakpoints in the conversation. The event detector can then apply a sliding window approach to create overlapping chunks of text, where each chunk comprises a fixed number of messages or a fixed number of tokens. For example, the event detector can create chunks of 100 tokens with a 50-token overlap between adjacent chunks. This overlapping approach ensures that context is preserved across chunk boundaries and reduces the risk of missing events that span multiple chunks. The event detector can also implement adaptive chunking strategies that adjust the chunk size based on the density of relevant information in different parts of the conversation. For instance, the event detector can use smaller chunks in areas with high event density and larger chunks in areas with less relevant information. Additionally, the event detector can employ a hierarchical processing approach, where it first applies a coarse-grained event detection model to the entire conversation to identify regions of interest, and then uses more fine-grained models on the relevant chunks for detailed event extraction. This chunking approach allows the event detector to efficiently process long conversations while maintaining the ability to capture complex, context-dependent events that may span multiple messages or sections of the chat.

Figure 5A:
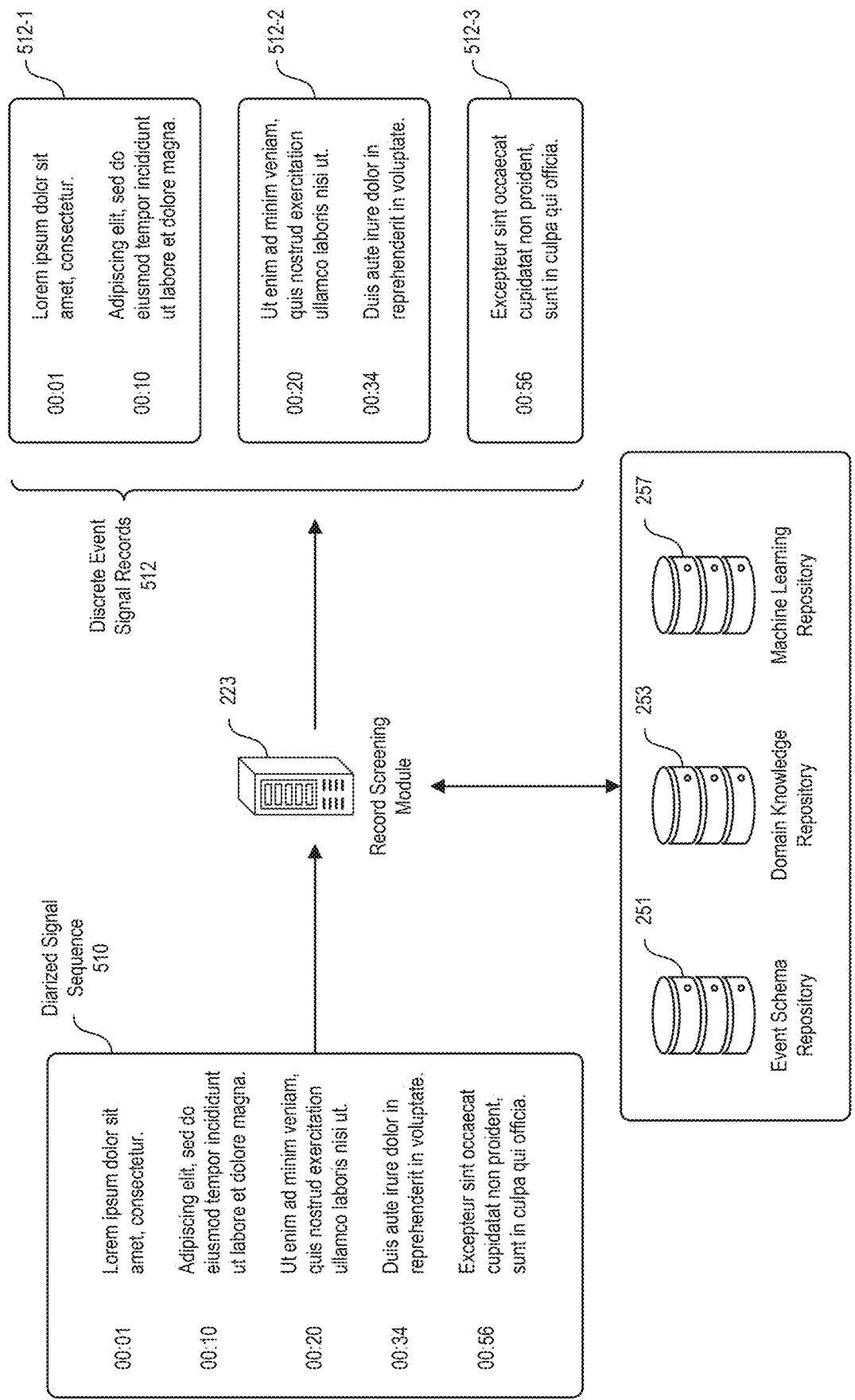

FIGS. 5A-5B are block diagrams that illustrate an example implementation of a record conversion system for processing of diarized signal sequences and a time-enumerated data structure in accordance with some implementations of the disclosed technology. The record screening module 223 can process a diarized signal sequence 510 to generate discrete event signal records 512. The record screening module 223 can employ various natural language processing and machine learning techniques (e.g., tokenization, named entity recognition, sequence labeling, and/or the like) to analyze and segment the diarized signal sequence 510 into distinct events. The record screening module 223 can first tokenize the diarized signal sequence 510 by breaking down the text into individual words or component words (e.g., splitting sentences into words, handling contractions, separating punctuation, and/or the like). The record screening module 223 can then apply named entity recognition to identify and classify named entities (e.g., person names, organization names, product names, numerical values, and/or the like) within the tokenized text. Additionally, the record screening module 223 can implement sequence labeling techniques (e.g., conditional random fields, bidirectional long short-term memory networks with conditional random field layers, and/or the like) to assign labels to each token or group of tokens, indicating their role in potential events (e.g., event start, event end, event type, event attributes, and/or the like). The record screening module 223 can further utilize rule-based systems or machine learning classifiers (e.g., support vector machines, random forests, neural networks, and/or the like) to identify patterns and structures indicative of discrete events within the diarized signal sequence 510. Through these processes, the record screening module 223 can effectively segment the continuous diarized signal sequence 510 into a set of discrete event signal records 512, each representing a distinct event or interaction within the monitored digital communication.

In additional or alternative implementations, the record screening module 223 can be configured to store the diarized signal sequence 510 as a single discrete event signal record 512 (e.g., assigning entire contiguous sequence of diarized signals as an individual event record). As an illustrative example, the record screening module 223 can receive a short plaintext transcript with speaker-identified timestamps (e.g., diarized signal sequence 510) for an audio-recorded conversation between two or more users. In this example, the record screening module 223 can process the short plaintext transcript (e.g., via natural language processing and/or machine learning techniques described herein) to selectively determine that the latent contents of the audio-recorded conversation exclusively correspond to a particular event type (e.g., an asset transaction event, an informational inquiry, and/or the like). Accordingly, the record screening module 223 can assign the entire, unsegmented short plaintext transcript as a single discrete event record associated with the particular event type.

In some implementations, the record screening module 223 can selectively modify the discrete event signal records 512, or the diarized signal sequence 510, via evaluating the content relevancy of the records 512, or sequence 510. As an illustrative example, the record screening module 223 can input a timestamped plaintext transcript of an audio-recorded conversation (e.g., discrete event signal record 512) into a generative model (e.g., a large language model, a natural language processing algorithm, and/or the like) to output a shortened version of the transcript that excludes sub-sequences of transcript data corresponding to low content relevancy. In particular, the record screening module 223 can input a content relevancy criterion (e.g., a user-configured natural language prompt for generating relevancy scores for each event signal record and a corresponding score validation threshold) and/or a set of positive, or negative, reference samples (e.g., stored plaintext transcript segments with pre-determined positive or negative relevancy scores) into the generative model along with the timestamped plaintext transcript to output the updated version of the transcript that removes portions of the original plaintext transcript that fails to satisfy the content relevancy criterion.

In some implementations, the record screening module 223 can interface with multiple repositories to enhance the event detection and segmentation process. The record screening module 223 can access an event schema repository 251 to retrieve predefined event definitions and structures (e.g., event types, required attributes, valid value ranges, and/or the like) that guide the identification and classification of events within the diarized signal sequence 510. The record screening module 223 can also utilize a domain knowledge repository 253 to incorporate domain-specific information (e.g., financial terminology, product specifications, market data, regulatory information, and/or the like) into the event detection process, improving the accuracy and relevance of the identified events. Additionally, the record screening module 223 can leverage a machine learning repository 257 to access pre-trained models or algorithms (e.g., neural network architectures, decision tree ensembles, probabilistic graphical models, and/or the like) specifically designed for event detection and classification tasks. The record screening module 223 can dynamically select and apply these models based on the characteristics of the input diarized signal sequence 510 and the specific requirements of the event detection task. By integrating information and resources from these repositories, the record screening module 223 can enhance the robustness and adaptability of the event detection process, enabling accurate identification of diverse event types across different domains and communication contexts.

In some implementations, the record screening module 223 can generate a set of discrete event signal records 512, such as a first event record 512-1, a second event record 512-2, and a third event record 512-3, as shown in FIG. 5A. Each of these event records can represent a distinct event or interaction identified within the diarized signal sequence 510. The record screening module 223 can structure each event record to comprise essential information about the detected event (e.g., event type, start time, end time, participants, key attributes, and/or the like). For example, the first event record 512-1 can correspond to a request for quote event, comprising details such as the product inquired about, the quantity requested, and the time of the request. The second event record 512-2 can represent a price quotation event, including information like the quoted price, the validity period of the quote, and any terms or conditions associated with the offer. The third event record 512-3 can capture a transaction confirmation event, encompassing details such as the agreed-upon price, quantity, settlement date, and any other relevant transaction parameters. The record screening module 223 can ensure that each event record maintains a consistent structure while accommodating the specific attributes and details relevant to its particular event type. This structured representation of discrete events enables efficient storage, retrieval, and analysis of the extracted information from the diarized signal sequence 510.

As shown in FIG. 5B, the record screening module 223 can utilize a time-enumerated data structure to organize and store event information extracted from the diarized signal sequence 510. This time-enumerated data structure can be implemented as a tabular matrix (e.g., a two-dimensional array, a database table, a spreadsheet-like structure, and/or the like) that efficiently captures and represents the temporal and categorical aspects of detected events. The time-enumerated data structure can include multiple columns identified by event identifiers 520, which serve as unique labels or keys for each event entry. The record screening module 223 can populate the time-enumerated data structure with specific event details organized into distinct columns. These columns can include a start time column 522 for recording the precise moment when events begin (e.g., timestamp of the first relevant message or action), an end time column 524 for capturing the conclusion time of events (e.g., timestamp of the last relevant message or action), an event type column 526 for categorizing the nature of events (e.g., quote request, order placement, trade confirmation, and/or the like), and a relevance column 528 for indicating whether events are relevant or valid within the context of the analysis (e.g., binary flags, relevance scores, confidence values, and/or the like). The record screening module 223 can populate each row of the time-enumerated data structure with data corresponding to a single event, ensuring that all temporal and categorical information is accurately captured and easily accessible for subsequent processing and analysis.

In some implementations, the record screening module 223 can generate categorical labels, or quantitative scores, indicating content relevance of individual discrete event signal records 512. As an illustrative example, the record screening module 223 can process an input transcript of an audio-recorded conversation (e.g., via natural language processing and/or machine learning techniques described herein) to selectively segment a sub-sequence of timestamped plaintext that is assigned to a target event type. The record screening module 223 can input the sub-sequence of timestamped plaintext and a pre-determined set of positive, or negative, plaintext samples (e.g., diarized transcript sequences with validated positive or negative relevance labels) associated with the target event type into a generative model (e.g., a large language model, a natural language processing model, and/or the like) to generate an output label (e.g., a binary boolean, a floating-point score, or the like) indicating content relevance for the transcript sub-sequence. Accordingly, the record screening module 223 can update the time-enumerated data structure to include an event identifier 520 for the segmented transcript sub-sequence with the output label under the relevance column 528. In additional or alternative implementations, the record screening module 223 can be configured to dynamically prune entries within the time-enumerated data structure (e.g., skipping addition of non-relevant record entries, retroactive removal of non-relevant record entries, and/or the like) to exclude event identifiers 520 for discrete event signal records 512 corresponding to relevance labels that fail to satisfy a relevance threshold (e.g., binary non-relevance label, a floating-point constant, and/or the like).

In some implementations, the record screening module 223 can generate a unique identifier for each discrete event detected within the monitored digital communication. The unique identifier can comprise a start timestamp and a termination timestamp associated with the continuous subsequence of timestamped alphanumeric signal data from the diarized sequence that corresponds to the event. The record screening module 223 can extract these timestamps from the metadata associated with the messages or actions that mark the beginning and end of the event. For example, the start timestamp can be derived from the timestamp of the first message that initiates a quote request, while the termination timestamp can be taken from the last message that concludes the negotiation or confirms the transaction. The record screening module 223 can combine these timestamps (e.g., by concatenating them with a delimiter, encoding them into a single value, hashing them together, and/or the like) to create a unique identifier that not only distinguishes the event from others but also encapsulates its temporal boundaries. This unique identifier can be used as a key in the time-enumerated data structure, allowing for efficient indexing, retrieval, and correlation of event data. Additionally, the record screening module 223 can incorporate other relevant information (e.g., event type, participant identifiers, transaction amounts, and/or the like) into the unique identifier to further enhance its specificity and informativeness.

In some implementations, the record screening module 223 can employ advanced techniques to handle complex scenarios in event detection and segmentation. For instance, the record screening module 223 can implement overlapping window analysis to address cases where events may not have clear-cut boundaries or may partially overlap in time. The record screening module 223 can slide a window of a predetermined size (e.g., a fixed number of tokens, a time-based duration, and/or the like) across the diarized signal sequence 510, with each window potentially capturing parts of multiple events. The record screening module 223 can then apply event detection algorithms to each window, allowing for the identification of events that span window boundaries. Additionally, the record screening module 223 can utilize hierarchical event detection approaches to handle nested or multi-level events. In this approach, the record screening module 223 can first identify high-level events (e.g., a complete trading session) and then recursively analyze within these high-level events to detect more granular sub-events (e.g., individual quote requests, negotiations, and confirmations within the trading session). Furthermore, the record screening module 223 can implement context-aware event boundary detection, taking into account not only the content of messages but also changes in conversation participants, shifts in topic, or temporal gaps between messages to more accurately determine the start and end points of discrete events.

Figure 6A:
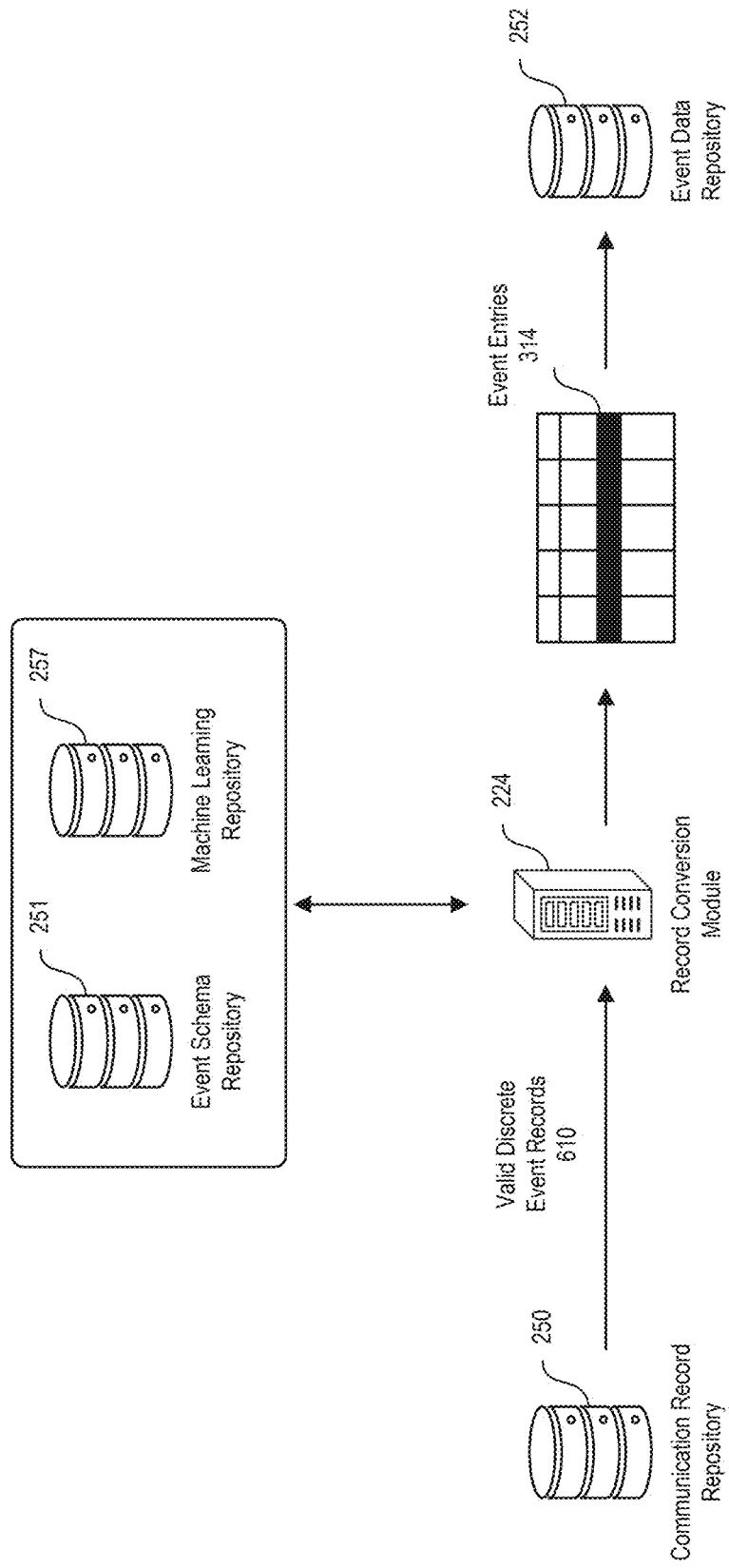

FIGS. 6A-6B are block diagrams that illustrate an example implementation of a record conversion system for converting communication records to event entries and a time-enumerated data structure in accordance with some implementations of the disclosed technology. The record conversion module 224 can process valid discrete event records 610 (e.g., discrete events identified as relevant by the record screening module 223) to generate event entries 314. The record conversion module 224 can employ various natural language processing and machine learning techniques (e.g., named entity recognition, relation extraction, sequence labeling, and/or the like) to extract relevant information from the valid discrete event records 610 and structure the information into event entries 314. The record conversion module 224 can first tokenize the text within each valid discrete event record 610, breaking down the content into individual words or component words (e.g., splitting sentences into words, handling contractions, separating punctuation, and/or the like). The record conversion module 224 can then apply named entity recognition to identify and classify key entities within the tokenized text (e.g., product names, quantities, prices, participant names, and/or the like). Additionally, the record conversion module 224 can implement relation extraction techniques to determine the relationships between identified entities (e.g., associating a quantity with a specific product, linking a price to a particular transaction, and/or the like). The record conversion module 224 can further utilize sequence labeling models (e.g., conditional random fields, bidirectional long short-term memory networks with conditional random field layers, and/or the like) to assign labels to each token or group of tokens, indicating their role in the event (e.g., event type, event attributes, temporal information, and/or the like). Through these processes, the record conversion module 224 can transform the unstructured or semi-structured content of valid discrete event records 610 into structured event entries 314 that capture the essential information and context of each event.

In some implementations, the record conversion module 224 can process valid discrete event records 610 using generative models (e.g., large language models, natural language processing algorithms, and/or the like) to generate the event entries 314 for the time-enumerated data structure. As an illustrative example, the record conversion module 224 can input a diarized signal sub-sequence associated with a valid discrete event record 610 (e.g., a portion of plaintext transcript associated with the event record) into a generative AI model to output a structured dataset comprising one or more event attributes 630 for the event entry 314 of the valid discrete event record 610. In some implementations, the record conversion module 224 can input, into the generative model, a user-configured natural language prompt (e.g., a plaintext description appended and/or adjacent to the input diarized signal sub-sequence) that specifies a target set of event attributes 630 extracted from the input diarized signal sub-sequence. In some implementations, the record conversion module 224 can input, into the generative model, a reference set of positive, or negative, attribute samples (e.g., paired examples of input diarized signal sub-sequence data and extracted event attributes).

In some implementations, the record conversion module 224 can interface with multiple repositories to enhance the event entry generation process. The record conversion module 224 can access the communication record repository 250 to retrieve additional context or historical information related to the valid discrete event records 610 (e.g., previous interactions, participant profiles, communication patterns, and/or the like). The record conversion module 224 can also utilize the event schema repository 251 to ensure that the generated event entries 314 conform to predefined event structures and formats (e.g., required fields, data types, value ranges, and/or the like). Additionally, the record conversion module 224 can leverage the machine learning repository 257 to access pre-trained models or algorithms specifically designed for event extraction and structuring tasks (e.g., domain-specific named entity recognition models, custom relation extraction classifiers, specialized sequence labeling architectures, and/or the like). The record conversion module 224 can dynamically select and apply these models based on the characteristics of the input valid discrete event records 610 and the specific requirements of the event entry generation task. For example, the record conversion module 224 can use different models for processing events from various financial domains (e.g., forex trading, equity transactions, commodity contracts, and/or the like), each tailored to handle the unique terminology, structures, and relationships prevalent in that domain. By integrating information and resources from these repositories, the record conversion module 224 can enhance the accuracy, consistency, and domain-specificity of the generated event entries 314.

In some implementations, the record conversion module 224 can generate a time-enumerated data structure 620 to store and organize the event entries 314. The time-enumerated data structure 620 can be implemented as a tabular matrix (e.g., a two-dimensional array, a database table, a spreadsheet-like structure, and/or the like) that efficiently captures and represents the temporal and categorical aspects of the event entries 314. The record conversion module 224 can structure the time-enumerated data structure 620 with a column-wise data series corresponding to a normalized event attribute set 630, where each column represents a specific attribute or characteristic of the events. The record conversion module 224 can also organize the time-enumerated data structure 620 with a row-wise data series corresponding to the event entries 314, where each row represents a distinct event entry. The record conversion module 224 can populate each cell of the tabular matrix with a select event attribute value of a select event entry, ensuring that all relevant information is captured in a structured and easily accessible format. For example, the record conversion module 224 can create columns for attributes such as event identifier, timestamp, event type, participant identifiers, product information, quantity, price, and any other relevant characteristics specific to the domain or event type. The record conversion module 224 can then populate each row with the corresponding values extracted from the event entries 314, creating a comprehensive and organized representation of the event data.

In some implementations, the normalized event attribute set 630 of the time-enumerated data structure 620 can comprise a minimum event attribute set for uniquely identifying each event entry 314. The record conversion module 224 can carefully select and define the attributes included in the normalized event attribute set 630 to ensure that each event entry can be distinctly identified and differentiated from others. The normalized event attribute set 630 can include attributes such as a field 631 for event identifier (e.g., a unique alphanumeric code assigned to each event), a field 632 for date (e.g., the calendar date of the event occurrence), a field 633 for timestamp (e.g., the precise time of the event, including hours, minutes, and seconds), a field 634 for initiator (e.g., the identifier of the user or system that initiated the event), a field 635 for size (e.g., the quantity or volume associated with the event), a field 636 for action (e.g., the type of action performed, such as bid, offer, or trade), a field 637 for status (e.g., the current state of the event, such as pending, completed, or cancelled), and a field 638 for quantity (e.g., a numerical value representing the amount involved in the event). The record conversion module 224 can ensure that the combination of these attributes provides a unique signature for each event entry, allowing for efficient indexing, retrieval, and analysis of the event data. For example, in a financial trading context, the record conversion module 224 can use the combination of timestamp, initiator, product identifier, action type, and quantity to uniquely identify a specific trade event, distinguishing it from all other events in the system.

In some implementations, the record conversion module 224 can perform the updating of the time-enumerated data structure 620 for the valid discrete event records 610 contemporaneously with the processing of the monitored digital communication 300. The record conversion module 224 can implement a real-time or near-real-time processing pipeline that continuously ingests valid discrete event records 610, generates corresponding event entries 314, and updates the time-enumerated data structure 620 with minimal latency. The record conversion module 224 can utilize efficient data structures and algorithms (e.g., circular buffers, lock-free queues, and/or the like) to manage the flow of incoming valid discrete event records 610 and ensure rapid processing. Additionally, the record conversion module 224 can employ parallel processing techniques (e.g., multi-threading, distributed computing, and/or the like) to handle multiple valid discrete event records 610 simultaneously, further reducing the overall processing time. The record conversion module 224 can also implement incremental update mechanisms for the time-enumerated data structure 620, allowing for efficient insertion, modification, or deletion of event entries without requiring a complete rebuild of the structure. For example, in a high-frequency trading scenario, the record conversion module 224 can process thousands of valid discrete event records 610 per second, continuously updating the time-enumerated data structure 620 to reflect the latest market events and transactions in real-time. This contemporaneous updating ensures that the time-enumerated data structure 620 always comprises the most up-to-date and accurate representation of the event data, enabling timely analysis and decision-making based on the latest information.

In some implementations, the record conversion module 224 can handle financial jargon and abbreviations specific to different lines of business when processing valid discrete event records 610 and generating event entries 314. The record conversion module 224 can utilize domain-specific lexicons and ontologies (e.g., financial dictionaries, industry-specific terminology databases, and/or the like) to recognize and interpret specialized terms and abbreviations commonly used in various financial sectors. For example, in forex trading, the record conversion module 224 can correctly interpret terms like "cable" as referring to the GBP/USD currency pair, "pips" as price interest points, or "yard" as a billion units of currency. In equity trading, the record conversion module 224 can understand abbreviations like "EOD" for end-of-day, "VWAP" for volume-weighted average price, or "ADR" for American Depositary Receipt. The record conversion module 224 can also implement context-aware disambiguation techniques to correctly interpret terms that may have different meanings in different financial contexts. For instance, the term "spread" can be interpreted differently in options trading (e.g., the difference between strike prices) versus in fixed income markets (e.g., the difference between bid and ask prices). By incorporating this domain-specific knowledge, the record conversion module 224 can accurately extract and structure information from valid discrete event records 610 across various financial domains, ensuring that the generated event entries 314 and the resulting time-enumerated data structure 620 accurately capture the nuances and specificities of different lines of business.

Figure 7A:
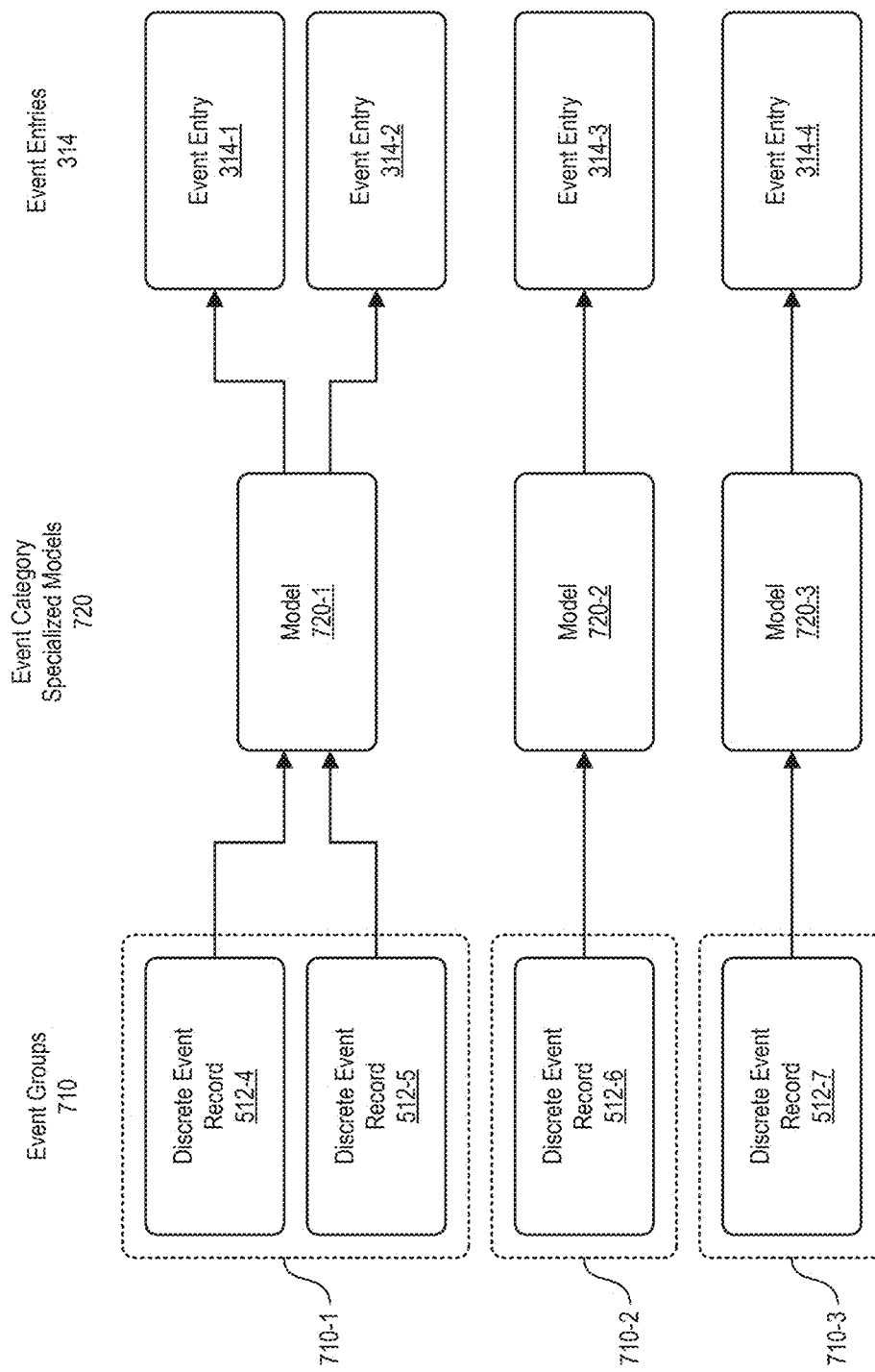
FIGS. 7A-7B are block diagrams that illustrate an example implementation of a record conversion system for processing of event groups into event entries and generation of event attributes from discrete event records in accordance with some implementations of the disclosed technology.
Figure 7B:
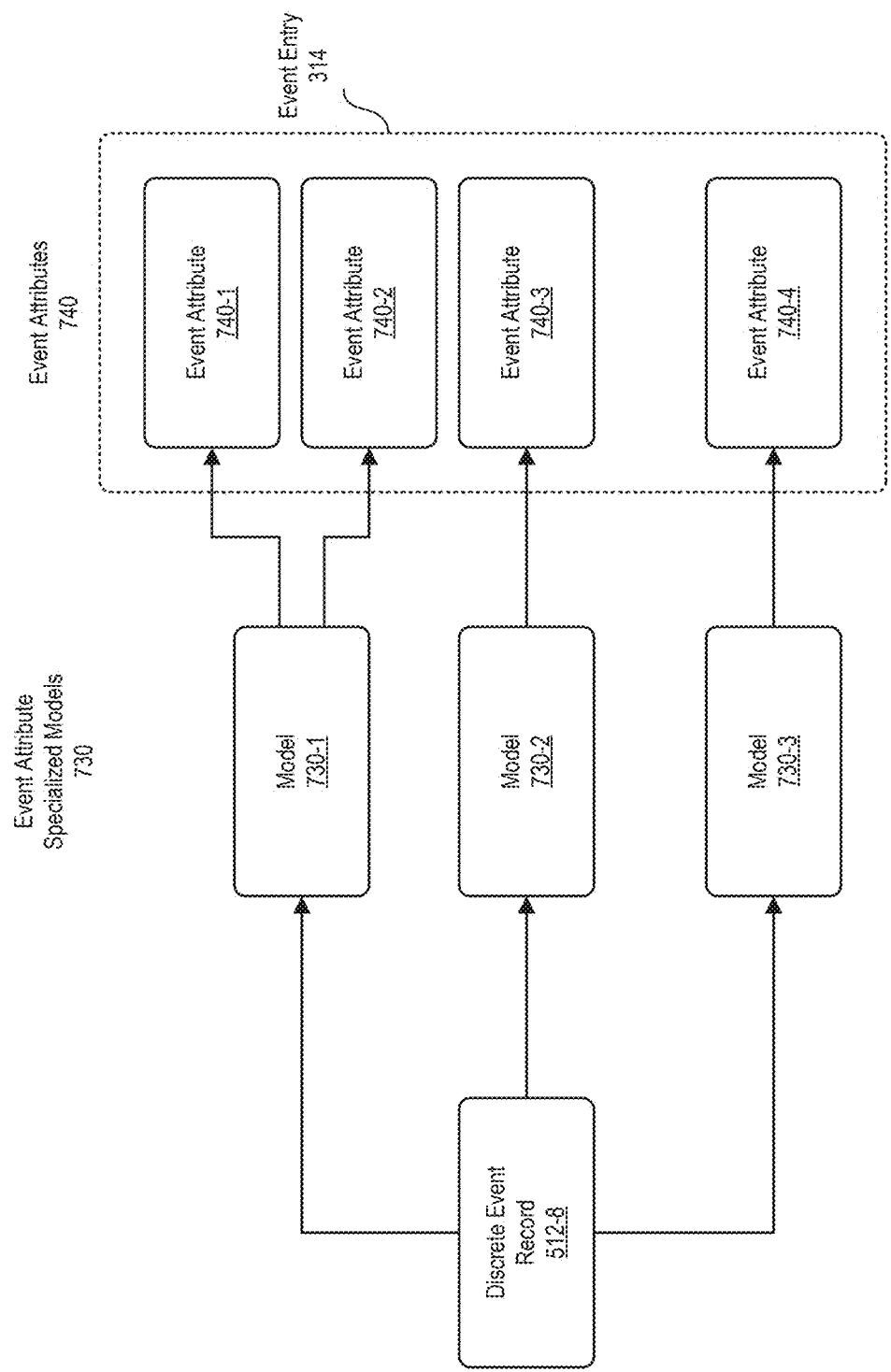

FIGS. 7A-7B are block diagrams that illustrate an example implementation of a record conversion system for processing of event groups into event entries and generation of event attributes from discrete event records in accordance with some implementations of the disclosed technology. The record conversion system 200 can process event groups 710 through specialized models 720 to generate event entries 314, as shown in FIG. 7A. The record conversion system 200 can employ various machine learning techniques (e.g., neural networks, decision trees, support vector machines, and/or the like) to analyze and extract relevant information from the event groups 710. The record conversion system 200 can first segment the monitored digital communication 300 into distinct event groups 710 based on temporal proximity, thematic coherence, or participant interactions. For example, the record conversion system 200 can utilize natural language processing algorithms (e.g., topic modeling, semantic similarity analysis, and/or the like) to identify clusters of related messages or actions within the monitored digital communication 300. The record conversion system 200 can then assign each cluster to a specific event group 710, such as a first event group 710-1, a second event group 710-2, or a third event group 710-3.

In some implementations, the record conversion system 200 can apply specialized models 720 to each event group 710 to generate corresponding event entries 314. The specialized models 720 can comprise a set of machine learning models (e.g., recurrent neural networks, transformer-based models, gradient boosting machines, and/or the like) trained on domain-specific data to recognize and extract relevant information from different types of event groups 710. For example, the record conversion system 200 can utilize a first model 720-1 to process the first event group 710-1, which can comprise discrete event signal records 512 related to quote requests. The first model 720-1 can be specifically trained to identify key elements of quote requests, such as product identifiers, quantities, and pricing parameters. The record conversion system 200 can apply a second model 720-2 to the second event group 710-2, which can comprise discrete event signal records 512 associated with order placements. The second model 720-2 can be designed to extract order details, including transaction types, volumes, and execution instructions. The record conversion system 200 can employ a third model 720-3 to analyze the third event group 710-3, which can comprise discrete event signal records 512 related to trade confirmations. The third model 720-3 can be trained to recognize and extract confirmation-specific information, such as settlement dates, counterparty details, and final transaction terms.

In some implementations, the record conversion system 200 can process discrete event signal records 512 through event attribute specialized models 730 to extract event attributes 740, as illustrated in FIG. 7B. The record conversion system 200 can employ a modular approach to attribute extraction, utilizing multiple specialized models 730, each focused on extracting specific types of event attributes 740 from the discrete event signal records 512. For example, the record conversion system 200 can apply a first model 730-1 to extract a first event attribute 740-1, which can represent the event type (e.g., quote request, order placement, trade confirmation, and/or the like). The first model 730-1 can be trained on a diverse set of labeled event examples to accurately classify the type of event described in the discrete event signal record 512-8. The record conversion system 200 can utilize a second model 730-2 to extract a second event attribute 740-2, which can correspond to the event timestamp. The second model 730-2 can employ temporal expression recognition techniques (e.g., rule-based parsers, conditional random fields, and/or the like) to identify and normalize time-related information within the discrete event record 512-8. The record conversion system 200 can apply a third model 730-3 to extract a third event attribute 740-3, which can represent the event participants. The third model 730-3 can utilize named entity recognition algorithms (e.g., bidirectional long short-term memory networks, conditional random fields, and/or the like) to identify and classify participant names, roles, or identifiers within the discrete event signal record 512-8. The record conversion system 200 can use additional models to extract other event attributes 740, such as a fourth model (not shown) to extract a fourth event attribute 740-4, which can correspond to product information, quantities, or pricing details.

In some implementations, the record conversion system 200 can retrieve an annotated context sample set for machine learning models. The annotated context sample set can comprise examples of event-related data (e.g., message snippets, transaction records, market data, and/or the like) that have been manually or automatically labeled with relevant contextual information. The record conversion system 200 can structure the annotated context sample set to include positive sample events (e.g., correctly identified and processed events with associated attributes) or negative sample events (e.g., incorrectly identified or irrelevant data samples). For example, the record conversion system 200 can include positive sample events that demonstrate successful extraction of event attributes from various types of communications, such as correctly identified requests, placements, or confirmations. The record conversion system 200 can also incorporate negative sample events that illustrate common pitfalls or ambiguities in event identification, such as misclassified actions or incorrectly parsed values. By including both positive and negative samples, the record conversion system 200 can enhance the machine learning model's ability to distinguish between relevant and irrelevant information, improving its overall accuracy in event attribute extraction.

In some implementations, the record conversion system 200 can input the annotated context sample set along with other inputs into machine learning models to generate event attribute sets for discrete events. The record conversion system 200 can combine the annotated context sample set with continuous sub-sequences of discrete events and normalized event attribute sets of time-enumerated data structures to create comprehensive inputs for machine learning models. The record conversion system 200 can structure these inputs as multi-dimensional tensors (e.g., 3D arrays, sequences of matrices, and/or the like) that encapsulate temporal, contextual, and attribute-specific information from all sources. For example, the record conversion system 200 can arrange continuous sub-sequences as sequences of word embeddings (e.g., dense vector representations of words, contextual embeddings from pre-trained language models, and/or the like), normalized event attribute sets as fixed-length feature vectors, and annotated context samples as sets of labeled examples with similar structure. The record conversion system 200 can then feed these combined inputs into machine learning models, which can utilize attention mechanisms (e.g., self-attention, cross-attention, and/or the like) to weigh the importance of different input elements and generate refined event attribute sets. This process can enable machine learning models to leverage both specific contexts of current events and broader patterns learned from annotated samples, resulting in more accurate and contextually appropriate event attribute extraction.

In some implementations, the record conversion system 200 can selectively identify event categories for discrete events from multiple event categories. The record conversion system 200 can employ hierarchical classification approaches to determine the most appropriate event categories for discrete events. The record conversion system 200 can first apply coarse-grained classifiers (e.g., decision trees, support vector machines, neural networks, and/or the like) to assign discrete events to high-level categories based on key features extracted from continuous sub-sequences of the discrete events. The record conversion system 200 can then utilize sets of fine-grained classifiers, each specialized for specific high-level categories, to further refine the categorization. For example, within a particular high-level category, the record conversion system 200 can employ specialized classifiers to distinguish between different types of events based on more nuanced features of the event data. The record conversion system 200 can integrate contextual information from surrounding events or participant profiles to enhance the accuracy of the categorization process. By employing multi-stage classification approaches, the record conversion system 200 can achieve more precise and contextually appropriate identification of event categories for discrete events.

In some implementations, the record conversion system 200 can access event maps that link discrete event groups to multiple event categories. The event maps can be structured representations (e.g., graph databases, relational databases, key-value stores, and/or the like) that define associations between specific patterns or characteristics of discrete event groups and predefined event categories. The record conversion system 200 can populate the event maps with information derived from domain expertise, historical data analysis, and machine learning-based pattern recognition. For example, the record conversion system 200 can include mappings that associate specific keywords, phrase patterns, or numerical value ranges with particular event categories. The record conversion system 200 can also incorporate temporal and sequential relationships into the event maps, allowing for the identification of event categories based on the order and timing of messages within discrete event groups. The record conversion system 200 can continuously update and refine the event maps based on new data and feedback from human experts, ensuring that the mappings remain accurate and relevant as communication patterns and dynamics evolve.

In some implementations, the record conversion system 200 can add discrete events to select discrete event groups that comprise other discrete events corresponding to identified event categories. The record conversion system 200 can maintain dynamic structures (e.g., linked lists, trees, hash tables, and/or the like) for discrete event groups, allowing for efficient insertion and retrieval of related events. When adding discrete events to select discrete event groups, the record conversion system 200 can first verify that the discrete events within the groups are within timestamp thresholds of continuous sub-sequences of the discrete events. These temporal proximity checks can ensure that grouped events are contextually related and part of the same ongoing interactions or transactions. For example, the record conversion system 200 can set timestamp thresholds to configurable values (e.g., 5 minutes, 1 hour, 24 hours, and/or the like) based on typical durations of interactions in specific domains or contexts. If discrete events fall within these thresholds, the record conversion system 200 can insert the events into appropriate positions within select discrete event groups, maintaining chronological orders of events. In cases where discrete events and other discrete events in select discrete event groups comprise sequential timestamped alphanumeric signal data from diarized sequences, the record conversion system 200 can utilize this sequential information to establish more precise ordering and relationships between events within groups.

In some implementations, the record conversion system 200 can input continuous sub-sequences of discrete events from discrete event groups into machine learning models to generate event attribute sets. The record conversion system 200 can prepare inputs by concatenating continuous sub-sequences of discrete events within discrete event groups, preserving their temporal order. The record conversion system 200 can apply various preprocessing techniques (e.g., tokenization, normalization, feature extraction, and/or the like) to transform raw text or structured data of continuous sub-sequences into formats suitable for machine learning models. For example, the record conversion system 200 can convert sub-sequences into sequences of word embeddings or contextual embeddings, capturing semantic and syntactic properties of text. The record conversion system 200 can also incorporate positional encodings to preserve relative positions of events within groups. By inputting entire discrete event groups into machine learning models, the record conversion system 200 can enable models to leverage contextual information from related events when generating event attribute sets. This approach can improve accuracy and consistency of attribute extraction, especially for attributes that depend on broader contexts of interactions or transactions.

In some implementations, the record conversion system 200 can use different machine learning models for different contexts or event types. The record conversion system 200 can maintain model registries (e.g., databases, configuration files, distributed key-value stores, and/or the like) that map specific contexts or event types to corresponding specialized models. For example, the record conversion system 200 can employ dedicated models for processing different types of events across various domains. Each of these models can be trained on domain-specific data and fine-tuned to recognize unique terminology, structures, and patterns prevalent in their respective areas. The record conversion system 200 can dynamically select appropriate models based on identified contexts or event types of discrete events. For instance, when processing discrete events related to complex transactions, the record conversion system 200 can choose models specifically trained on relevant domain data, capable of understanding and extracting attributes from sophisticated interactions. This specialized approach can enable the record conversion system 200 to achieve higher accuracy and more nuanced understanding across diverse domains.

In some implementations, the record conversion system 200 can infer missing information for incomplete events based on context from linked events. The record conversion system 200 can employ context-aware inference engines (e.g., probabilistic graphical models, neural networks with attention mechanisms, rule-based systems augmented with machine learning, and/or the like) to analyze relationships between events and fill in gaps in incomplete event data. When encountering events with missing attributes, the record conversion system 200 can first identify linked events within the same discrete event groups or across related groups. The record conversion system 200 can then extract relevant contextual information from these linked events, such as participant identities, product details, or transaction parameters. For example, if confirmation events are missing quantity information, the record conversion system 200 can look at preceding request or placement events to infer likely quantities. The record conversion system 200 can also utilize historical patterns and domain knowledge to make informed inferences. For instance, if regular patterns are observed where specific participants typically interact in certain ways, this information can be used to infer missing data in incomplete events. By leveraging context from linked events, the record conversion system 200 can significantly improve completeness and accuracy of event data, even when faced with partial or ambiguous information in individual events.

In some implementations, the record conversion system 200 can link related events across non-sequential parts of conversations. The record conversion system 200 can implement sophisticated event linking algorithms (e.g., graph-based approaches, semantic similarity models, temporal-contextual matching systems, and/or the like) to identify and connect related events that occur in different parts of monitored digital communications. The record conversion system 200 can first create semantic representations (e.g., dense vector embeddings, topic models, and/or the like) for events in conversations. Using these representations, the record conversion system 200 can compute similarity scores between events, taking into account factors such as shared entities, thematic coherence, and temporal proximity despite non-sequential occurrence. For example, if participants discuss specific topics early in conversations and then return to those topics much later, potentially after discussing other matters, the record conversion system 200 can link these non-adjacent events based on their shared context. The record conversion system 200 can also utilize coreference resolution techniques to track references to the same entities or topics across conversations, enabling connections of related events even when they use different terminology or phrasing. By establishing these links, the record conversion system 200 can create more comprehensive and accurate representations of complex, multi-step interactions that span non-contiguous parts of conversations.

Figure 8:
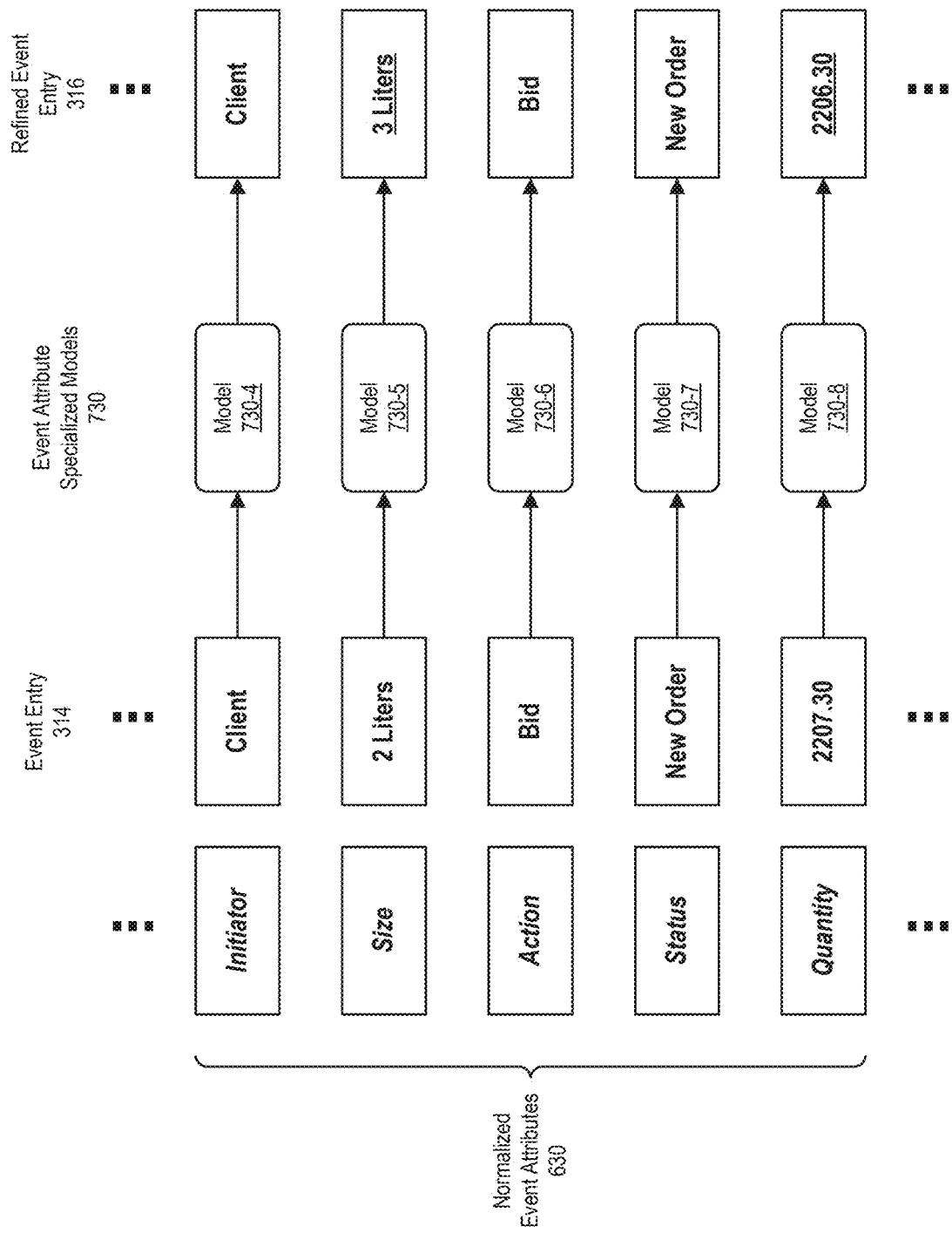
FIG. 8 is a block diagram that illustrates an example implementation of a record conversion system for processing of normalized event attributes through specialized models in accordance with some implementations of the disclosed technology.

FIG. 8 is a block diagram that illustrates an example implementation of a record conversion system for processing of normalized event attributes through specialized models in accordance with some implementations of the disclosed technology. The record conversion system 200 can refine event entries 314 using event attribute specialized models 730, as depicted in FIG. 8. The record conversion system 200 can employ a set of specialized models 730, each designed to process and enhance specific attributes of the event entries 314. For example, the record conversion system 200 can utilize a fourth model 730-4 to refine participant information within the event entries 314. The fourth model 730-4 can be trained on historical communication data and participant profiles to disambiguate and standardize participant identifiers, ensuring consistency across multiple event entries 314. The record conversion system 200 can apply a fifth model 730-5 to refine quantity information, converting various unit representations (e.g., "2 Liters" to "3 Liters") to a standardized format and resolving any ambiguities in quantity expressions. The record conversion system 200 can employ a sixth model 730-6 to refine action types (e.g., "Bid" to a standardized action code), a seventh model 730-7 to refine status information (e.g., "New Order" to a specific status code), and an eighth model 730-8 to refine quantity values, ensuring all numerical data is accurately represented and consistent with the event context.

In some implementations, the record conversion system 200 can implement a cascading refinement approach, where the output from one specialized model serves as input to another. For instance, after the fourth model 730-4 processes participant information, the refined participant data can be provided to other models that may require this contextual information to better process their respective attributes. This cascading approach enables each model to benefit from the refinements made by previous models, creating a more coherent and consistent set of refined event entries 316. The record conversion system 200 can also employ feedback mechanisms between the specialized models 730, allowing for iterative refinement of attributes that may have interdependencies. For example, if the sixth model 730-6 identifies a specific action type that typically corresponds to certain quantity ranges, it can provide this insight to the eighth model 730-8 to improve the accuracy of quantity value refinement.

The specialized models 730 can be implemented using various machine learning architectures tailored to their specific refinement tasks. For example, the fourth model 730-4 for participant information refinement can utilize named entity recognition techniques combined with graph-based relationship models to accurately identify and standardize participant references across different communication contexts. The fifth model 730-5 for quantity refinement can employ numerical normalization algorithms and unit conversion libraries, enhanced with domain-specific knowledge about typical quantity ranges and formats in the relevant business context. The sixth model 730-6 for action type refinement can implement classification algorithms trained on extensive datasets of labeled actions, enabling it to recognize and standardize various expressions of the same action type (e.g., "place bid," "bidding," "offer to buy" can all be standardized to a consistent "BID" action code). The specialized models 730 can be continuously improved through feedback loops that incorporate new data and validation results, ensuring that the refinement process becomes increasingly accurate over time.

Figure 9:
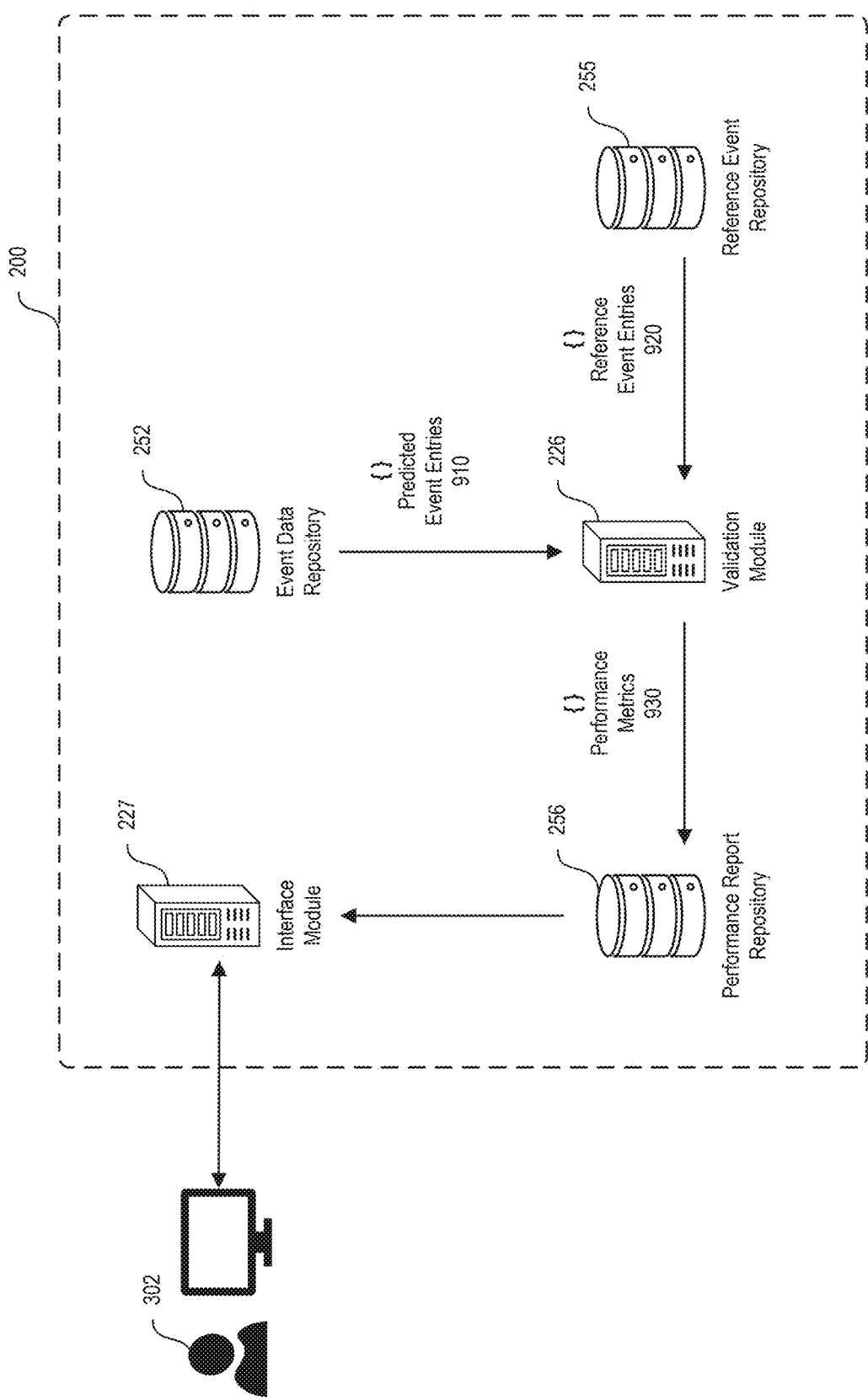
FIG. 9 is a block diagram that illustrates an example implementation of a record conversion system for validating predicted event entries in accordance with some implementations of the disclosed technology.

FIG. 9 is a block diagram that illustrates an example implementation of a record conversion system for validating predicted event entries in accordance with some implementations of the disclosed technology. The record conversion system 200 can implement a validation and performance evaluation process to assess the accuracy and effectiveness of the event entry generation. As shown in FIG. 9, the validation module 226 of the record conversion system 200 can process predicted event entries 910 and reference event entries 920 to generate performance metrics 930. The validation module 226 can retrieve the predicted event entries 910 from the event data repository 252 and the reference event entries 920 from the reference data repository 255. The predicted event entries 910 can represent the event data extracted and structured by the record conversion system 200 from the monitored digital communication 300, while the reference event entries 920 can serve as a ground truth dataset for comparison purposes. The validation module 226 can employ various comparison techniques (e.g., string matching algorithms, semantic similarity measures, numerical value comparisons, and/or the like) to evaluate the accuracy of the predicted event entries 910 against the reference event entries 920. The validation module 226 can generate performance metrics 930 based on these comparisons, which can include measures such as precision, recall, F1 score, and accuracy for different aspects of the event entries (e.g., event type classification accuracy, attribute extraction precision, temporal alignment accuracy, and/or the like). The validation module 226 can store the generated performance metrics 930 in the performance report repository 256, enabling tracking of system performance over time and facilitating continuous improvement of the record conversion system 200.

In some implementations, the validation module 226 can calculate key performance metrics indicating content accuracy based on the comparison between the predicted event entries 910 and the matched reference event entries 920. The validation module 226 can compute various metrics that provide insights into different aspects of the record conversion system 200's performance. For example, the validation module 226 can calculate precision metrics (e.g., the ratio of correctly identified event attributes to the total number of extracted attributes) to assess the accuracy of the information extraction process. The validation module 226 can compute recall metrics (e.g., the ratio of correctly identified event attributes to the total number of attributes in the reference data) to evaluate the completeness of the extracted information. The validation module 226 can also calculate F1 scores (e.g., the harmonic mean of precision and recall) to provide a balanced measure of the system's performance. Additionally, the validation module 226 can compute specific metrics for different types of event attributes, such as temporal accuracy metrics (e.g., mean absolute error in timestamp extraction), entity recognition accuracy (e.g., F1 score for participant identification), and numerical value accuracy (e.g., mean percentage error for extracted quantities or prices). The validation module 226 can aggregate these metrics across multiple event entries and over time to generate trend analyses and performance summaries. By calculating and analyzing these key performance metrics, the validation module 226 can provide a comprehensive assessment of the record conversion system 200's content accuracy, enabling data-driven decisions for system improvements and optimizations.

In some implementations, the validation module 226 can automatically retrain a generative AI model when a performance metric fails to satisfy a predefined tolerance threshold. The validation module 226 can continuously monitor the calculated performance metrics 930 and compare them against a set of tolerance thresholds defined for each metric. These tolerance thresholds can be stored in the reference data repository 255 and can be dynamically adjusted based on evolving system requirements or domain-specific standards. When the validation module 226 detects that a performance metric falls below the corresponding tolerance threshold, the validation module 226 can trigger an automatic retraining process for the relevant generative AI model. The validation module 226 can coordinate with the machine learning repository 257 to retrieve the current model architecture and parameters. The validation module 226 can then initiate a retraining procedure using a combination of the existing training data and the newly processed event entries, with a particular focus on the types of events or attributes that exhibited poor performance. The validation module 226 can employ techniques such as transfer learning (e.g., fine-tuning pre-trained models on domain-specific data), active learning (e.g., prioritizing the most informative or challenging examples for retraining), or curriculum learning (e.g., gradually increasing the complexity of training examples) to enhance the model's performance efficiently. After retraining, the validation module 226 can evaluate the updated model on a held-out validation set to ensure that the performance has indeed improved before deploying the retrained model back into the production environment of the record conversion system 200.

In some implementations, the validation module 226 can transmit an alert indicating detection of invalid event entries when certain performance metrics fall significantly below their tolerance thresholds. The validation module 226 can implement an alert generation system that monitors the calculated performance metrics 930 in real-time or near-real-time. When the validation module 226 detects a severe degradation in performance, such as a sharp drop in precision or recall for critical event attributes, the validation module 226 can generate a detailed alert message. This alert can include information such as the specific performance metrics that triggered the alert, the extent of the deviation from the tolerance thresholds, and examples of the invalid event entries detected. The validation module 226 can utilize the interface module 227 to transmit this alert to relevant users 302 (e.g., system administrators, data quality analysts, domain experts, and/or the like) through various communication channels (e.g., email notifications, SMS alerts, dashboard notifications, API callbacks, and/or the like). The alert can be formatted to include visualizations (e.g., trend charts, comparison tables, highlighted examples, and/or the like) that help recipients quickly understand the nature and severity of the detected issues. Additionally, the validation module 226 can implement an escalation mechanism where alerts for persistent or severe issues can be automatically escalated to higher levels of management or specialized response teams. By promptly notifying relevant stakeholders about detected invalid event entries, the validation module 226 can enable rapid response and mitigation strategies to maintain the overall quality and reliability of the event data processed by the record conversion system 200.

In some implementations, the validation module 226 can update the predicted time-enumerated data structure by removing event entries with invalid event attributes. After identifying invalid event entries through the validation process, the validation module 226 can implement a data cleansing procedure to maintain the integrity of the event data stored in the event data repository 252. The validation module 226 can first create a temporary copy of the time-enumerated data structure comprising the predicted event entries 910. The validation module 226 can then iterate through this structure, evaluating each event entry against the validation results and predefined quality criteria. For event entries that comprise invalid attributes (e.g., attributes with similarity scores below a certain threshold, attributes that violate domain-specific constraints, or attributes that are inconsistent with related events), the validation module 226 can mark these entries for removal. The validation module 226 can implement different strategies for handling invalid entries, such as complete removal of the entry, partial removal of only the invalid attributes while retaining valid ones, or flagging the entry for manual review. After processing all entries, the validation module 226 can generate an updated version of the time-enumerated data structure that excludes or flags the identified invalid entries. The validation module 226 can then use atomic update operations to replace the original time-enumerated data structure in the event data repository 252 with this cleansed version, ensuring data consistency throughout the update process. By systematically removing or flagging invalid event entries, the validation module 226 can maintain a high-quality dataset that more accurately represents the events extracted from the monitored digital communication 300, enhancing the reliability of subsequent analyses and decision-making processes based on this data.

In some implementations, the complementary reference event attribute sets used for validation can originate from user-generated content. The validation module 226 can leverage a system for collecting and curating user-generated annotations or corrections to create a high-quality reference dataset. The validation module 226 can interface with a user annotation platform (e.g., a web-based interface, a mobile application, a dedicated annotation tool, and/or the like) that allows domain experts or trained annotators to review samples of the monitored digital communication 300 and manually create or correct event entries. The validation module 226 can implement a workflow where annotators can view the original communication content alongside the automatically extracted event entries, enabling them to verify, correct, or add missing information. The validation module 226 can employ quality control mechanisms such as inter-annotator agreement metrics, expert review processes, and iterative refinement cycles to ensure the reliability and consistency of the user-generated annotations. The validation module 226 can store these curated annotations as reference event entries 920 in the reference data repository 255, associating them with metadata such as annotator identifiers, confidence scores, and timestamps. By utilizing user-generated content for the reference event attribute sets, the validation module 226 can create a dynamic and evolving ground truth dataset that reflects human expertise and domain knowledge, providing a robust basis for evaluating and improving the performance of the record conversion system 200.

Figure 10:
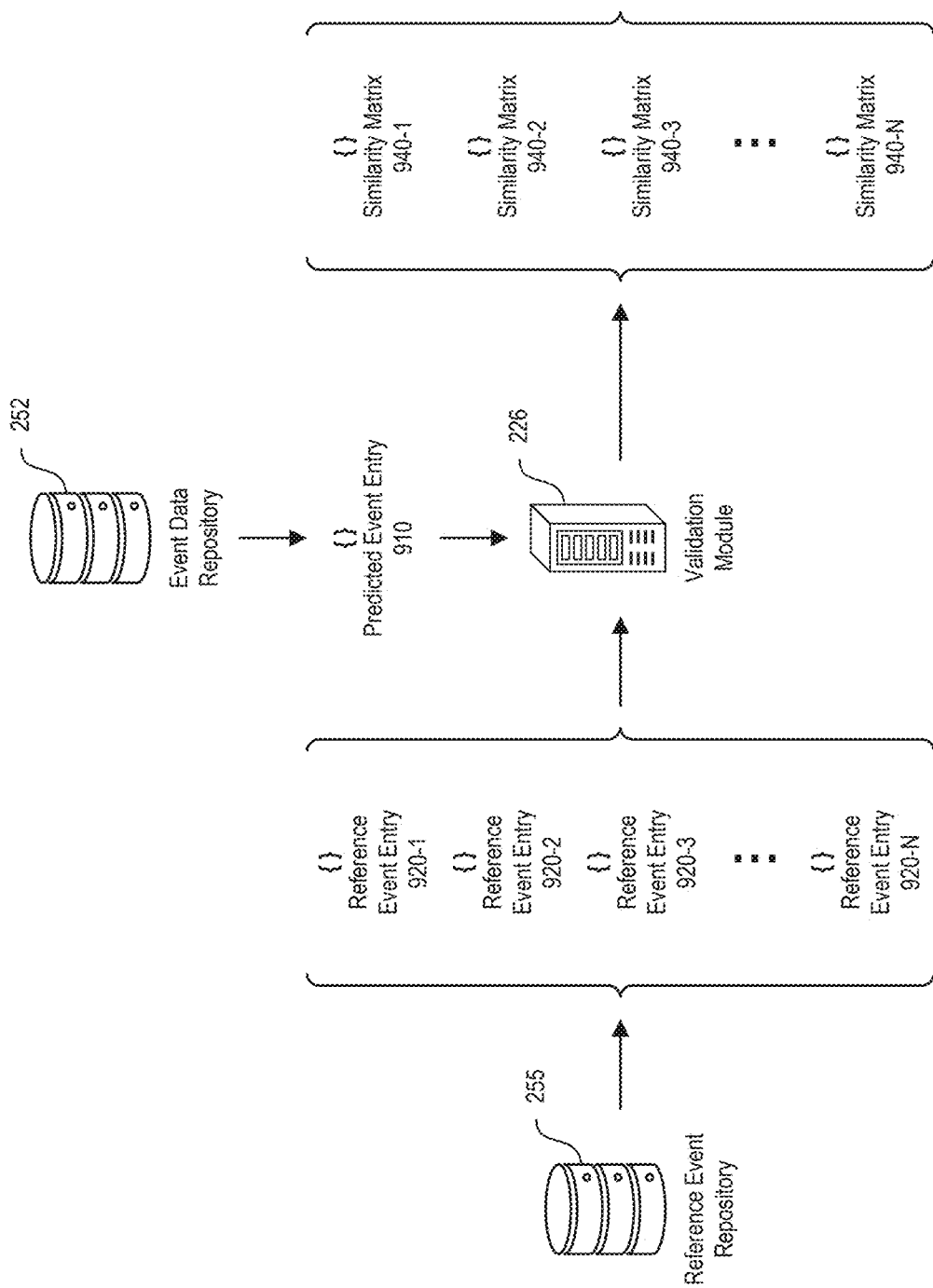
FIG. 10 is a block diagram that illustrates an example implementation of a record conversion system for validating predicted event entries in accordance with some implementations of the disclosed technology.

FIG. 10 is a block diagram that illustrates an example implementation of a record conversion system for validating predicted event entries in accordance with some implementations of the disclosed technology. The validation module 226 can utilize similarity matrices to compare the predicted event entries 910 with the reference event entries 920. The validation module 226 can generate a similarity matrix (e.g., similarity matrix 940-1, similarity matrix 940-2, similarity matrix 940-3, similarity matrix 940-N) for each pair of predicted and reference event entries. Each similarity matrix can represent a two-dimensional array where rows correspond to attributes of a predicted event entry and columns correspond to attributes of a reference event entry. The validation module 226 can populate each cell of the similarity matrix with a similarity score that quantifies the degree of match between the corresponding attributes of the predicted and reference event entries. The validation module 226 can employ various similarity calculation techniques (e.g., Levenshtein distance for string comparisons, cosine similarity for vector representations, Jaccard similarity for set-based attributes, and/or the like) to compute these similarity scores. For numerical attributes, the validation module 226 can use normalized difference measures or custom similarity functions that account for domain-specific tolerance levels. The validation module 226 can also implement weighted similarity scoring, where certain attributes are given higher importance based on their criticality to the event's meaning or business relevance. For example, in financial trading events, attributes such as price, quantity, and product identifier might receive higher weights than descriptive comments or secondary metadata. Additionally, the validation module 226 can apply contextual similarity measures that consider not just the isolated attribute values but also their relationships with other attributes within the same event entry. The validation module 226 can analyze these similarity matrices to identify the best matching pairs of predicted and reference event entries, enabling a comprehensive evaluation of the record conversion system 200's performance in extracting and structuring event data from the monitored digital communication 300.

In some implementations, the validation module 226 can apply the Hungarian algorithm, also known as the Kuhn-Munkres algorithm, to identify the optimal matching between predicted event entries 910 and reference event entries 920. The Hungarian algorithm can be particularly useful when the number of predicted event entries 910 does not exactly match the number of reference event entries 920, or when there can be ambiguity in the matching process. The validation module 226 can first construct a cost matrix based on the similarity matrices, where each element represents the cost (e.g., dissimilarity or distance) of matching a specific predicted event entry to a reference event entry. The validation module 226 can then apply the Hungarian algorithm to this cost matrix to find the optimal assignment that minimizes the total cost of matching. This process can ensure that each predicted event entry 910 can be matched to the most similar reference event entry 920, even in cases where there can be slight temporal misalignments or variations in the extracted information. The validation module 226 can implement the Hungarian algorithm using efficient data structures (e.g., priority queues, adjacency lists, and/or the like) and optimization techniques (e.g., sparse matrix representations, parallelized computations, and/or the like) to handle large numbers of event entries efficiently. The validation module 226 can also incorporate temporal constraints into the matching process by applying time window restrictions that limit the potential matches to reference events occurring within a configurable time range of each predicted event. This temporal constraint can help prevent erroneous matches between events that are semantically similar but temporally distant, which is particularly important in time-sensitive domains such as financial trading or emergency response systems. Furthermore, the validation module 226 can implement iterative refinement of the matching process, where initial matches are established based on high-confidence attributes, and then progressively refined by considering lower-confidence attributes or more complex similarity measures. This multi-stage matching approach can improve both the accuracy and computational efficiency of the validation process, especially when dealing with large volumes of event entries. By leveraging the Hungarian algorithm, the validation module 226 can provide a robust and mathematically sound approach to event matching, enabling accurate performance evaluation of the record conversion system 200.

Figure 11:
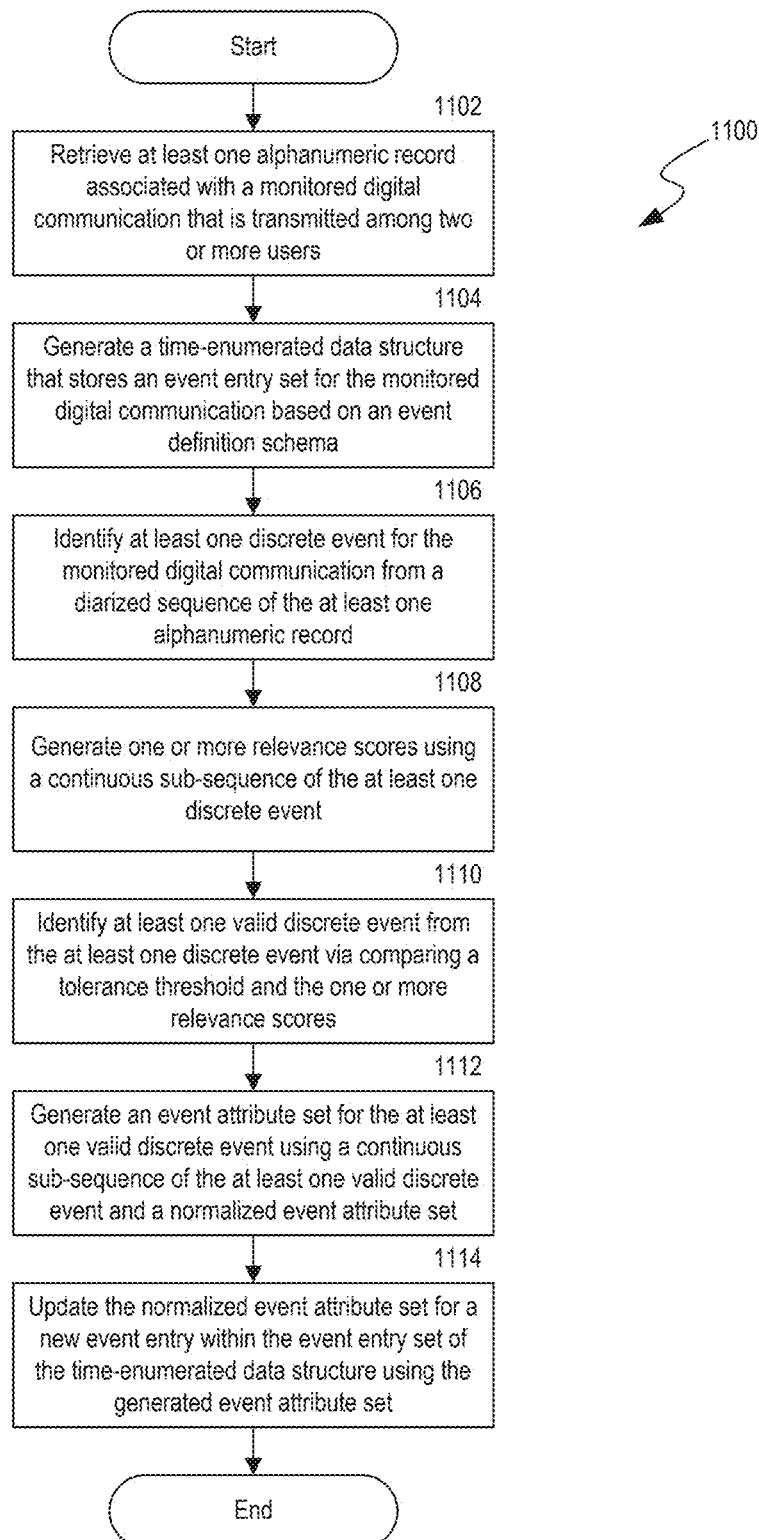
FIG. 11 is a flow diagram that illustrates an example process for generating time-enumerated events in accordance with some implementations of the disclosed technology.

FIG. 11 is a flow diagram that illustrates an example process 1100 for generating time-enumerated events in accordance with some implementations of the disclosed technology. The process 1100 (e.g., a computer-implemented method) can be performed by a system (e.g., record conversion system 200) configured to selectively extract and convert digital communications records (e.g., alphanumeric signal data) into standardized event entries within a time-enumerated data structure. In one example, the system includes at least one hardware processor and at least one non-transitory memory storing instructions, which, when executed by the at least one hardware processor, cause the system to perform the process 1100. In another example, the system includes a non-transitory, computer-readable storage medium comprising instructions recorded thereon, which, when executed by at least one data processor, cause the system to perform the process 1100.

At block 1102, the system can retrieve an alphanumeric record set associated with a monitored digital communication transmitted among two or more users. For example, the system can retrieve one or more alphanumeric records, where each record each comprises a diarized sequence of timestamped alphanumeric signal data from the monitored digital communication. In some implementations, retrieval of the alphanumeric record set of the monitored digital communication can be performed in contemporaneous time with transmission of the monitored digital communication among the two or more users.

At block 1104, the system can generate a time-enumerated data structure that stores an event entry set for the monitored digital communication. For example, the system can use an event definition schema to generate a time-enumerated data structure that comprises a normalized event attribute set for event entries of the event entry set. In some implementations, the normalized event attribute set can comprise an event identifier, a user identifier, an event action type, an event action value, an item identifier, an item value, or a combination thereof. In some implementations, the normalized event attribute set can comprise a minimum event attribute set for uniquely identifying each event entry stored in the time-enumerated data structure. In some implementations, the time-enumerated data structure can comprise a tabular matrix, where the tabular matrix includes a column-wise data series corresponding to the normalized event attribute set and a row-wise data series corresponding to the event entry set. In some implementations, each cell of the tabular matrix can represent a select event attribute value of a select event entry within the time-enumerated data structure.

At block 1106, the system can generate new event entries within the time-enumerated data structure for each alphanumeric record within the alphanumeric record set. For example, at block 1106, the system can selectively identify at least one discrete event for the monitored digital communication from the diarized sequence of the alphanumeric record. In some implementations, the at least one discrete event can comprise a continuous sub-sequence of timestamped alphanumeric signal data from the diarized sequence.

In some implementations, the system can generate a unique identifier for the at least one discrete event of the monitored digital communication. For example, the system can generate a unique identifier that comprises a start timestamp and a termination timestamp associated with the continuous sub-sequence of timestamped alphanumeric signal data from the diarized sequence.

At block 1108, the system can input the continuous sub-sequence of the at least one discrete event into a first generative AI model to generate one or more relevance scores for the at least one discrete event. In some implementations, the relevance score can be indicative of a degree of association of the at least one discrete event to one or more event categories of the event definition schema.

In some implementations, the system can retrieve an annotated context sample set for the second generative AI model. In some implementations, the annotated context sample set can comprise at least one positive sample event comprising diarized sequences of timestamped alphanumeric signal data associated with a positive relevance score. In additional or alternative implementations, the at least one negative sample event can comprise diarized sequences of timestamped alphanumeric signal data associated with a negative relevance score. In some implementations, the system can input the continuous sub-sequence of the at least one valid discrete event, the normalized event attribute set of the time-enumerated data structure, and the annotated context sample set into the second generative AI model to generate the event attribute set for the at least one valid discrete event.

At block 1110, the system can identify at least one valid discrete event from the at least one discrete event. For example, the system can compare a tolerance threshold value and the one or more relevance scores for the at least one discrete event to identify the at least one valid discrete event from the at least one discrete event. In some implementations, the system can access an event map that links discrete event groups of the monitored digital communication to the one or more event categories. In some implementations, the system can add the at least one valid discrete event to a select discrete event group that comprises discrete events corresponding to the identified event category of the at least one valid discrete event. In some implementations, the discrete events of the select discrete event group can be within a timestamp threshold of the continuous sub-sequence of the at least one valid discrete event. In some implementations, the at least one valid discrete event and the discrete events of the select discrete event group can comprise sequential timestamped alphanumeric signal data from the diarized sequence.

At block 1112, the system can input a continuous sub-sequence of the at least one valid discrete event and the normalized event attribute set of the time-enumerated data structure into a second generative AI model to generate an event attribute set for the at least one valid discrete event. In some implementations, each event attribute of the event attribute set can correspond to an alphanumeric signal data subset of the continuous sub-sequence. In some implementations, the system can selectively identify an event category for the at least one valid discrete event from the one or more event categories. For example, the system can use the continuous sub-sequence of the at least one valid discrete event to identify the event category from the one or more event categories.

In some implementations, the system can input continuous sub-sequences of the discrete events of the select discrete event group, the continuous sub-sequence of the at least one valid discrete event and the normalized event attribute set of the time-enumerated data structure into the second generative AI model to generate an event attribute set for the at least one valid discrete event.

In some implementations, the system can access a model map that links event categories of the one or more event categories to generative AI models trained to generate normalized event attributes for events associated with the linked event categories. In some implementations, the system can determine (e.g., using the model map) a third generative AI model trained to generate normalized event attributes for event entries that correspond to the event category of the at least one valid discrete event. Accordingly, the system can input the continuous sub-sequences of the at least one valid discrete event and the normalized event attribute set of the time-enumerated data structure into the third machine learning model to generate the event attribute set for the at least one valid discrete event.

At block 1114, the system can update the normalized event attribute set for a new event entry within the event entry set of the time-enumerated data structure. For example, the system can use the generated event attribute set for the at least one valid discrete event to update the normalized event attribute set for the new event entry. In some implementations, the new event entry can correspond to the at least one valid discrete event. In some implementations, updating the time-enumerated data structure for the alphanumeric record sets can be performed contemporaneously. In some implementations, the system can transmit for display (e.g., at a user interface of the two or more users) the updated time-enumerated data structure within an elapsed duration after retrieving the alphanumeric record set.

Figure 12:
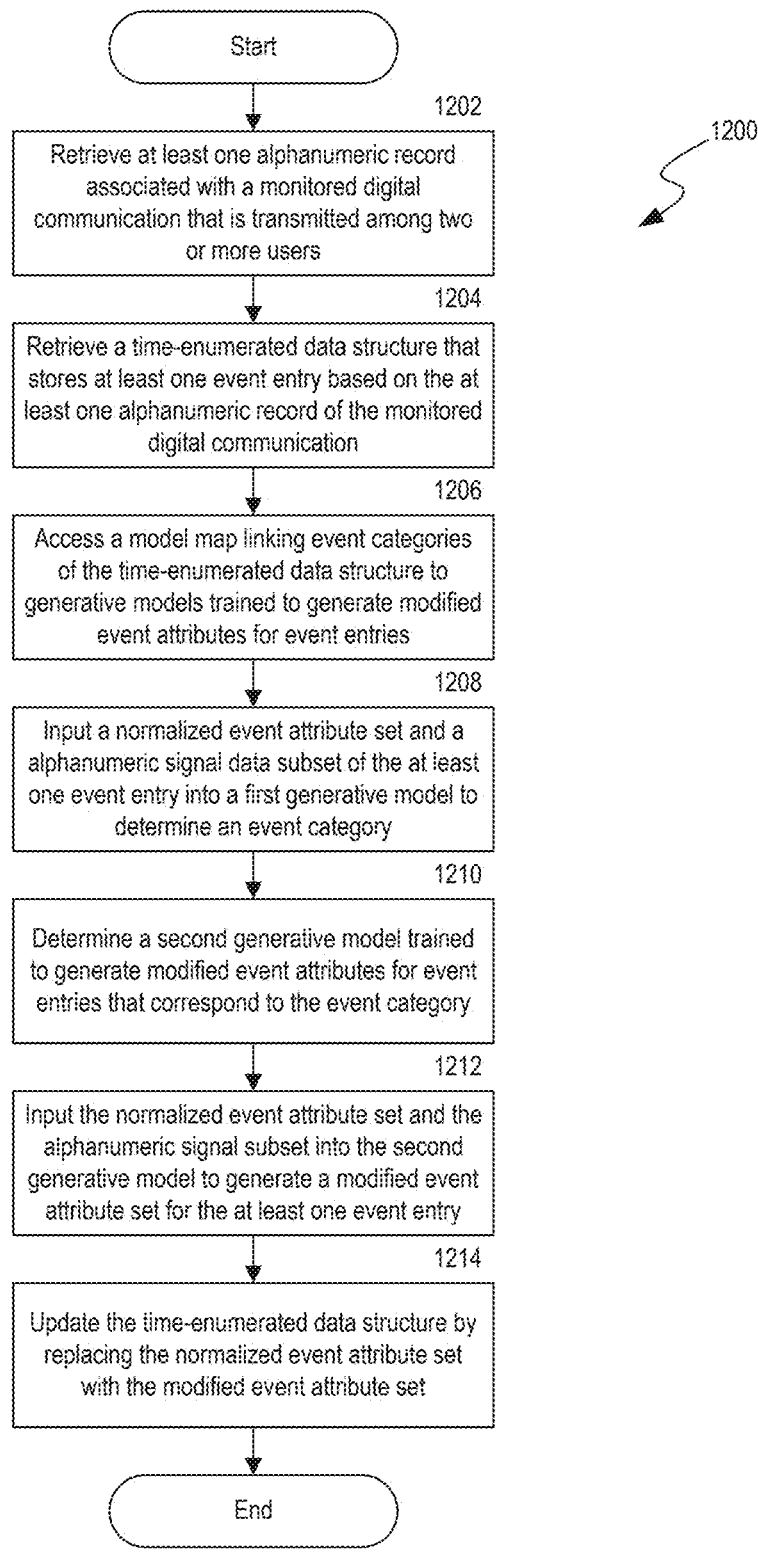
FIG. 12 is a flow diagram that illustrates an example process for updating time-enumerated events in accordance with some implementations of the disclosed technology.

FIG. 12 is a flow diagram that illustrates an example process 1200 for updating time-enumerated events in accordance with some implementations of the disclosed technology. The process 1200 (e.g., a computer-implemented method) can be performed by a system (e.g., record conversion system 200) configured to modify attribute values of event entries within a time-enumerated data structure using specialized generative AI models (e.g., agentic large language models, natural language processing algorithms, and/or the like). In one example, the system includes at least one hardware processor and at least one non-transitory memory storing instructions, which, when executed by the at least one hardware processor, cause the system to perform the process 1200. In another example, the system includes a non-transitory, computer-readable storage medium comprising instructions recorded thereon, which, when executed by at least one data processor, cause the system to perform the process 1200.

At block 1202, the system can retrieve an alphanumeric record set associated with a monitored digital communication transmitted among two or more users. In some implementations, each alphanumeric record can comprise a diarized sequence of timestamped alphanumeric signal data from the monitored digital communication.

At block 1204, the system can retrieve (e.g., from a remote database) a time-enumerated data structure that stores one or more event entries based on the alphanumeric record set of the monitored digital communication. In some implementations, each event entry can comprise a normalized event attribute set corresponding to an alphanumeric signal data subset of the diarized sequence. In some implementations, the normalized event attribute set can comprise an event identifier, a user identifier, an event action type, an event action value, an item identifier, an item value, or a combination thereof.

In some implementations, the time-enumerated data structure can comprise a tabular matrix, where the tabular matrix includes a column-wise data series corresponding to the normalized event attribute set and a row-wise data series corresponding to the one or more event entries. In some implementations, each cell of the tabular matrix can represent a select event attribute value of a select event entry within the time-enumerated data structure.

At block 1206, the system can access a model map that links event categories of the time-enumerated data structure to generative AI models trained to generate modified event attributes for event entries associated with the linked event categories. At block 1208, the system can generate a modified event attribute set for each select event entry within the one or more event entries. For example, the system can input the normalized event attribute set and the corresponding alphanumeric signal data subset of the select event entry into a first generative AI model to determine an event category for the event entry.

In some implementations, the system can access an event map that links event entry groups to the event categories of the time-enumerated data structure. In some implementations, the system can add the select event entry to a select event entry group that comprises event entries that correspond to the determined event category of the select event entry. In some implementations, the event entries of the select event entry group can be within a timestamp threshold of the select event entry. In some implementations, the select event entry and the event entries of the select event entry group can correspond to sequential timestamped alphanumeric signal data from the diarized sequence.

At block 1210, the system can determine a second generative AI model trained to generate modified event attributes for event entries that correspond to the event category of the event entry. For example, the system can use the model map to identify a second generative AI model to generate the modified event attributes. At block 1212, the system can input the normalized event attribute set and the alphanumeric signal subset of the select event entry into the second generative AI model to generate a modified event attribute set for the select event entry.

In some implementations, the system can access a second model map that links event attribute categories of the time-enumerated data structure to generative AI models trained to generate modified event attributes for individual normalized event attributes associated with the linked event attribute categories. In some implementations, the system can identify an event attribute category set for the normalized event attribute set of the select event entry. In some implementations, the system can determine (e.g., using the second model map) one or more generative AI models trained to generate modified event attributes for individual normalized event attributes associated with the identified event attribute category set for the select event entry. In some implementations, the system can input the normalized event attribute set and the alphanumeric signal subset of the select event entry into the one or more generative AI models to output generate the modified event attribute set for the select event entry.

In some implementations, the modified event attribute set of the selected event entry can comprise at least one event attribute not found in the normalized event attribute set of the selected event entry. In additional or alternative implementations, the normalized event attribute set of the selected event entry can comprise at least one event attribute not found in the modified event attribute set of the selected event entry.

At block 1214, the system can update the time-enumerated data structure by replacing the normalized event attribute set of the selected event entry with the modified event attribute set of the selected event entry. In some implementations, updating the time-enumerated data structure for the one or more event entries can be performed contemporaneously. In some implementations, the system can transmit the updated time-enumerated data structure within an elapsed duration after retrieving the at least one alphanumeric record.

Figure 13:
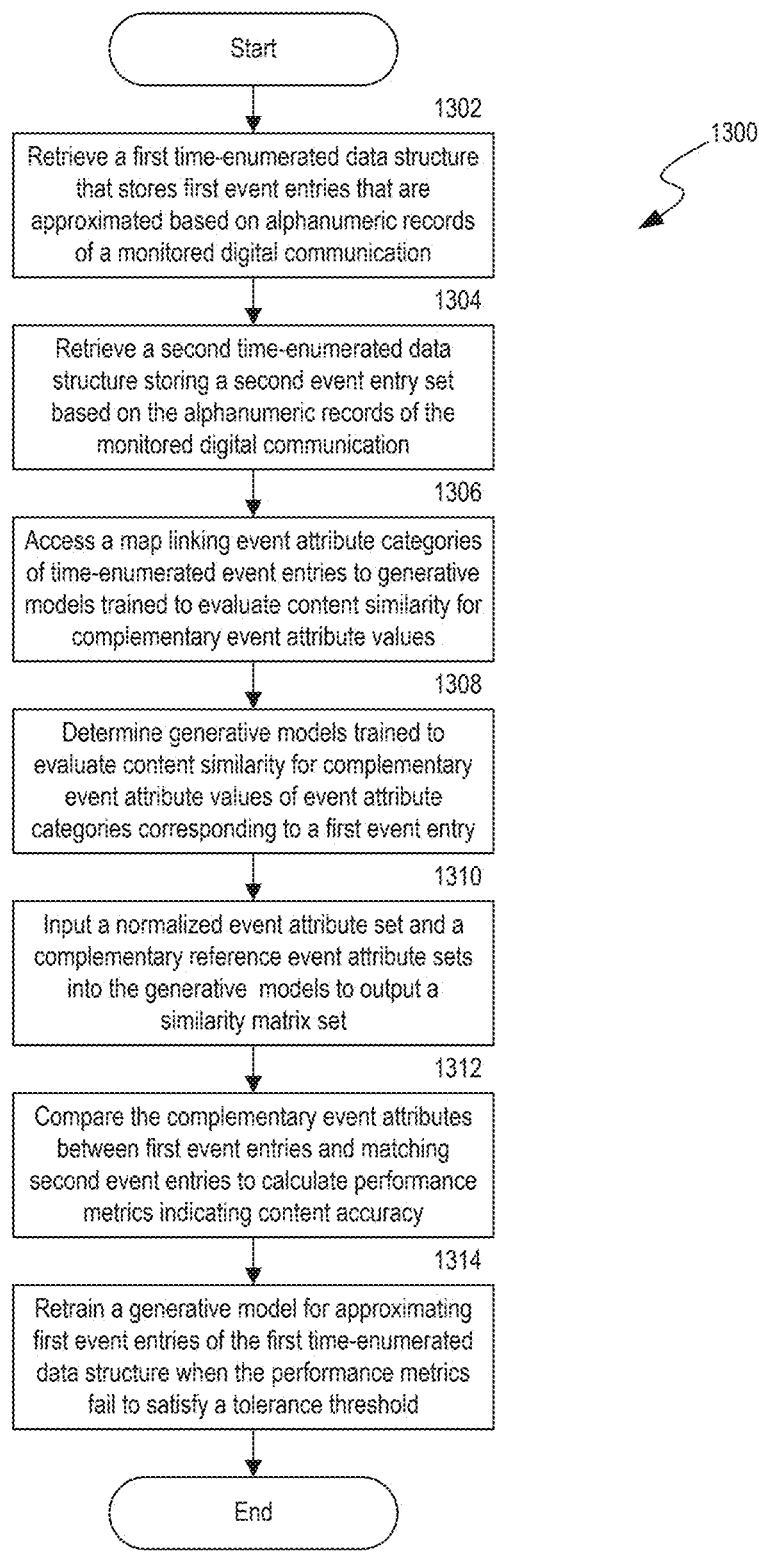
FIG. 13 is a flow diagram that illustrates an example process 1300 for evaluating time-enumerated event entries in accordance with some implementations of the disclosed technology

FIG. 13 is a flow diagram that illustrates an example process 1300 for evaluating time-enumerated event entries in accordance with some implementations of the disclosed technology. The process 1300 (e.g., a computer-implemented method) can be performed by a system (e.g., record conversion system 200) configured to evaluate one or more performance metrics via comparing content similarities between predicted time-enumerated event entries and reference time-enumerated event entries (e.g., ground-truth and/or human labeled). In one example, the system includes at least one hardware processor and at least one non-transitory memory storing instructions, which, when executed by the at least one hardware processor, cause the system to perform the process 1300. In another example, the system includes a non-transitory, computer-readable storage medium comprising instructions recorded thereon, which, when executed by at least one data processor, cause the system to perform the process 1300.

At block 1302, the system can retrieve a first time-enumerated data structure storing a first event entry set approximated based on alphanumeric records of a monitored digital communication transmitted among two or more users. In some implementations, each first event entry can comprise a normalized event attribute set corresponding to an alphanumeric signal data subset of the alphanumeric records. In some implementations, the first time-enumerated data structure can comprise a tabular matrix, where the tabular matrix includes a column-wise data series corresponding to the normalized event attribute set and a row-wise data series corresponding to the one or more event entries. In some implementations, each cell of the tabular matrix can represent a select event attribute value of a select event entry within the time-enumerated data structure. In some implementations, the normalized event attribute set can comprise an event identifier, a user identifier, an event action type, an event action value, an item identifier, an item value, or a combination thereof. In some implementations, the system can update the first time-enumerated data structure by removing event entries that comprise normalized event attribute sets with at least one invalid event attribute.

At block 1304, the system can retrieve a second time-enumerated data structure storing a second event entry set based on the alphanumeric records of the monitored digital communication. In some implementations, each second event entry can comprise a complementary reference event attribute set for the normalized event attribute sets of the first event entry set. In some implementations, the complementary reference event attribute sets for the second event entries of the second time-enumerated data structure can originate from user generated content for validating the first time-enumerated data structure.

At block 1306, the system can access a model map that links event attribute categories of the first and the second time-enumerated data structures to generative AI models trained to evaluate content similarity for complementary event attribute values associated with the linked event attribute categories.

At block 1308, the system can evaluate one or more performance metrics via determining degrees of content similarity for each select first event entry within the first time-enumerated data structure. For example, the system can identify an event attribute category set for the normalized event attribute set of the select first event entry. In some implementations, the system can determine (e.g., using the model map) one or more generative AI models trained to evaluate content similarity for complementary event attribute values associated with the identified event attribute category set for the select first event entry. In some implementations, the event attribute category set for the normalized event attribute set of the select first event entry can comprise an event attribute category representative of semantic alphanumeric signal data. In some implementations the system can input the normalized event attribute set and the corresponding alphanumeric signal data subset of the select first event entry into a second generative AI model to determine the event attribute category set for the select first event entry.

At block 1310, the system can input the normalized event attribute set of the first event entry and the complementary reference event attribute sets of the second event entry set into the one or more generative AI models to output a similarity matrix set. In some implementations, each similarity matrix can comprise a similarity score set that compares content similarities between complementary event attribute values of the select first event entry and a select second event entry within the second time-enumerated data structure.

In some implementations, the system can determine a first timestamp associated with the normalized event attribute set of the select first event entry. In some implementations, the system can selectively identify a second event entry subset (e.g., from the second time-enumerated data structure) comprising second event entries with complementary reference event attribute sets that correspond to timestamps within a time threshold of the first timestamp. In some implementations, the system can input the normalized event attribute set of the first event entry and the complementary reference event attribute sets of the second event entry subset into the one or more generative AI models to output the similarity matrix set.

At block 1312, the system can calculate one or more key performance metrics indicating content accuracy between first event entries and second event entries. For example, the system can identify a matching second event entry (e.g., from the second event entry set) for the select first event entry. In some implementations, the matching second event entry can correspond to the similarity matrix with the similarity score set that satisfies a similarity threshold. In some implementations, the system can calculate at least one key performance metric indicating content accuracy of the first event entry. For example, the system can compare the complementary event attribute values between the first event entry and the matching second event entry to determine the at least one key performance metric indicating content accuracy. In some implementations, the matching second event entry for the select first event entry can be identified, in part, by applying Hungarian, or Kuhn-Munkres, algorithm onto the generated similarity matrix for the select first event entry and the second event entries of the second time-enumerated data structure.

At block 1314, the system can retrain a generative AI model used to approximate the first event entry set of the first time-enumerated data structure. For example, when the at least one key performance metric fails to satisfy a tolerance threshold, the system can automatically retrain (e.g., using the second event entry set) the generative AI model. In some implementations, when the at least one key performance metric fails to satisfy the tolerance threshold, the system can transmit for display, at a user interface of the two or more users, an alert indicating detection of invalid event entries within the first time-enumerated data structure.

Example Machine Learning Architecture

Figure 14:
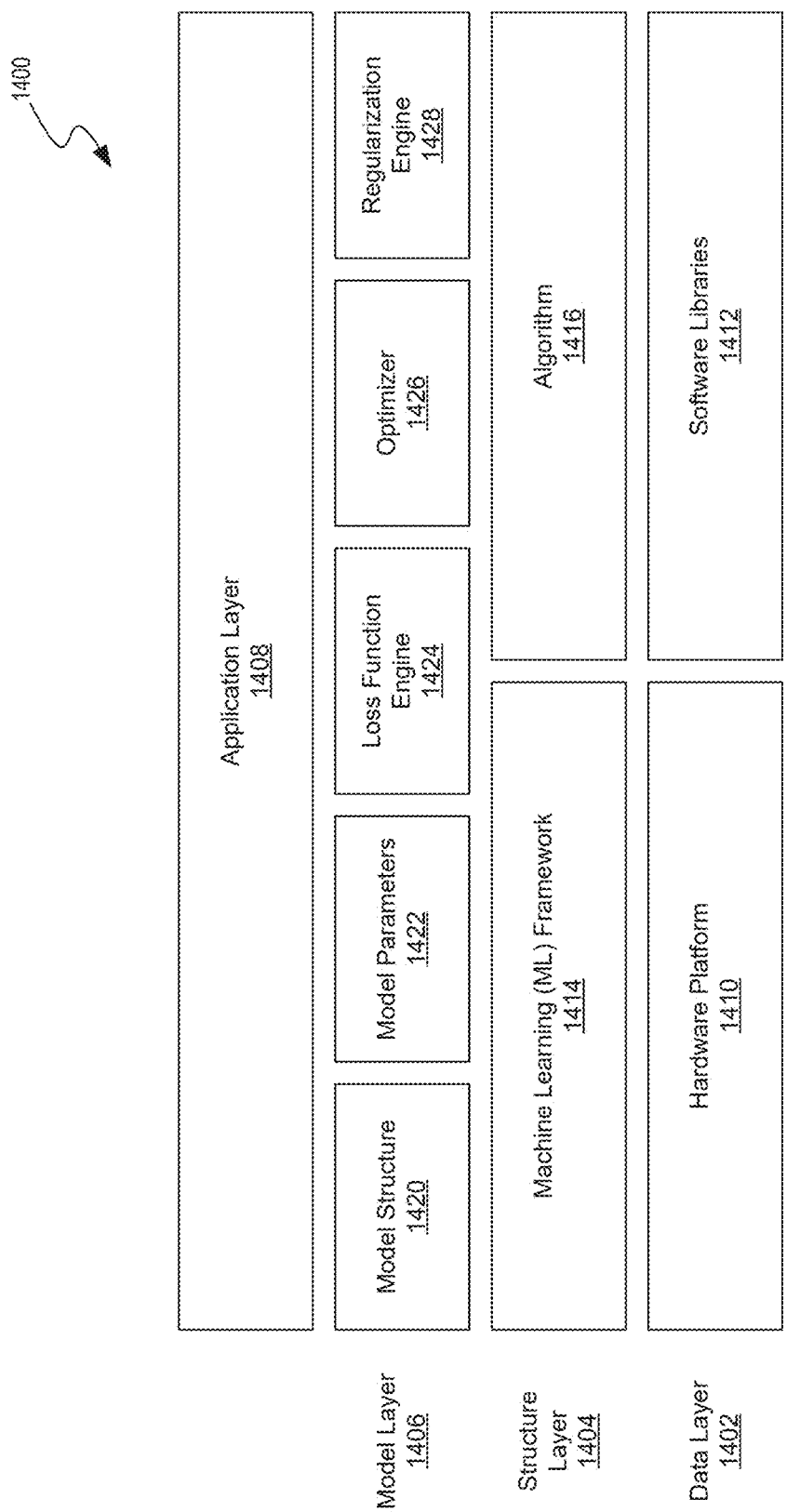
FIG. 14 illustrates a layered architecture of an artificial intelligence (AI) system that can implement the ML models of the record conversion system in accordance with some implementations of the present technology.

FIG. 14 illustrates a layered architecture of an artificial intelligence (AI) system 1400 that can implement the ML models of the record conversion system 200 of FIG. 2, in accordance with some implementations of the present technology. Example ML models can include one or more executable statistical inference algorithms stored at computing databases 115, 125 and/or retrieved from external service providers (e.g., a third-party cloud host) via the network 130 of the example computing environment 100. Accordingly, the computing environment 100 and/or components thereof (e.g., servers 110, 120, databases 115, 125, network 130, and/or the like) can include, or be incorporated within, one or more components of the AI system 1400. The AI system 1400 provides a comprehensive software stack capable of hosting suitable runtime environments for one or more operations of ML models, as further described herein.

As shown, the AI system 1400 can include a set of layers, which conceptually organize elements within an example network topology for the AI system's architecture to implement a particular AI model. Generally, an AI model is a computer-executable program implemented by the AI system 1400 that analyses input data to generate inferential output data (e.g., a classification label for input feature vectors). Information can pass through each layer of the AI system 1400 to generate outputs for the AI model. The layers can include a data layer 1402, a structure layer 1404, a model layer 1406, and an application layer 1408. The algorithm 1416 of the structure layer 1404 and the model structure 1420 and model parameters 1422 of the model layer 1406 together form an example AI model. The optimizer 1426, loss function engine 1424, and regularization engine 1428 work to refine and optimize the AI model, and the data layer 1402 provides resources and support for application of the AI model by the application layer 1408.

The data layer 1402 acts as the foundation of the AI system 1400 by preparing data for the AI model. As shown, the data layer 1402 can include two sub-layers: a hardware platform 1410 and one or more software libraries 1412. The hardware platform 1410 can be designed to perform operations for the AI model and include computing resources for storage, memory, logic and networking, such as the resources described in relation to FIGS. 1 and 16. The hardware platform 1410 can process amounts of data using one or more servers. The servers can perform backend operations such as matrix calculations, parallel calculations, machine learning (ML) training, and the like. Examples of servers used by the hardware platform 1410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1410 can include computing resources, (e.g., servers, memory, etc.) offered by a cloud services provider. The hardware platform 1410 can also include computer memory for storing data about the AI model, application of the AI model, and training data for the AI model. The computer memory can be a form of random-access memory (RAM), such as dynamic RAM, static RAM, and non-volatile RAM.

The software libraries 1412 can be thought of suites of data and programming code, including executables, used to control the computing resources of the hardware platform 1410. The programming code can include low-level primitives (e.g., fundamental language elements) that form the foundation of one or more low-level programming languages, such that servers of the hardware platform 1410 can use the low-level primitives to carry out specific operations. The low-level programming languages do not require much, if any, abstraction from a computing resource's instruction set architecture, allowing them to run quickly with a small memory footprint. Examples of software libraries 1412 that can be included in the AI system 1400 include INTEL Math Kernel Library, NVIDIA cuDNN, EIGEN, and OpenBLAS.

The structure layer 1404 can include an ML framework 1414 and an algorithm 1416. The ML framework 1414 can be thought of as an interface, library, or tool that allows users to build and deploy the AI model. The ML framework 1414 can include an open-source library, an application programming interface (API), a gradient-boosting library, an ensemble method, and/or a deep learning toolkit that work with the layers of the AI system facilitate development of the AI model. For example, the ML framework 1414 can distribute processes for application or training of the AI model across multiple resources in the hardware platform 1410. The ML framework 1414 can also include a set of pre-built components that have the functionality to implement and train the AI model and allow users to use pre-built functions and classes to construct and train the AI model. Thus, the ML framework 1414 can be used to facilitate data engineering, development, hyperparameter tuning, testing, and training for the AI model. Examples of ML frameworks 1414 that can be used in the AI system 1400 include TENSORFLOW, PYTORCH, SCIKIT-LEARN, KERAS, LightGBM, RANDOM FOREST, and AMAZON WEB SERVICES.

The algorithm 1416 can be an organized set of computer-executable operations used to generate output data from a set of input data and can be described using pseudocode. The algorithm 1416 can include complex code that allows the computing resources to learn from new input data and create new/modified outputs based on what was learned. In some implementations, the algorithm 1416 can build the AI model through being trained while running computing resources of the hardware platform 1410. This training allows the algorithm 1416 to make predictions or decisions without being explicitly programmed to do so. Once trained, the algorithm 1416 can run at the computing resources as part of the AI model to make predictions or decisions, improve computing resource performance, or perform tasks. The algorithm 1416 can be trained using supervised learning, unsupervised learning, semi-supervised learning, and/or reinforcement learning.

Using supervised learning, the algorithm 1416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. The user may label the training data based on one or more classes and trains the AI model by inputting the training data into the algorithm 1416. The algorithm determines how to label the new data based on the labeled training data. The user can facilitate collection, labeling, and/or input via the ML framework 1414. In some instances, the user may convert the training data to a set of feature vectors for input to the algorithm 1416. Once trained, the user can test the algorithm 1416 on new data to determine if the algorithm 1416 is predicting accurate labels for the new data. For example, the user can use cross-validation methods to test the accuracy of the algorithm 1416 and retrain the algorithm 1416 on new training data if the results of the cross-validation are below an accuracy threshold.

Supervised learning can involve classification and/or regression. Classification techniques involve teaching the algorithm 1416 to identify a category of new observations based on training data and are used when input data for the algorithm 1416 is discrete. Said differently, when learning through classification techniques, the algorithm 1416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1416 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1416 is continuous. Regression techniques can be used to train the algorithm 1416 to predict or forecast relationships between variables. To train the algorithm 1416 using regression techniques, a user can select a regression method for estimating the parameters of the model. The user collects and labels training data that is input to the algorithm 1416 such that the algorithm 1416 is trained to understand the relationship between data features and the dependent variable(s). Once trained, the algorithm 1416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1416 learns patterns from unlabeled training data. In particular, the algorithm 1416 is trained to learn hidden patterns and insights of input data, which can be used for data exploration or for generating new data. Here, the algorithm 1416 does not have a predefined output, unlike the labels output when the algorithm 1416 is trained using supervised learning. Said another way, unsupervised learning is used to train the algorithm 1416 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters comprise dissimilar data. For example, during clustering, data with possible similarities remains in a group that has less or no similarities to another group. Examples of clustering techniques density-based methods, hierarchical based methods, partitioning methods, and grid-based methods. In one example, the algorithm 1416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1416 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1416 include factor analysis, item response theory, latent profile analysis, and latent class analysis.

The model layer 1406 implements the AI model using data from the data layer and the algorithm 1416 and ML framework 1414 from the structure layer 1404, thus enabling decision-making capabilities of the AI system 1400. The model layer 1406 includes a model structure 1420, model parameters 1422, a loss function engine 1424, an optimizer 1426, and a regularization engine 1428.

The model structure 1420 describes the architecture of the AI model of the AI system 1400. The model structure 1420 defines the complexity of the pattern/relationship that the AI model expresses. Examples of structures that can be used as the model structure 1420 include decision trees, support vector machines, regression analyses, Bayesian networks, Gaussian processes, genetic algorithms, and artificial neural networks (or, simply, neural networks). The model structure 1420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1420 may include one or more hidden layers of nodes between the input and output layers. The model structure 1420 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1422 represent the relationships learned during training and can be used to make predictions and decisions based on input data. The model parameters 1422 can weight and bias the nodes and connections of the model structure 1420. For instance, when the model structure 1420 is a neural network, the model parameters 1422 can weight and bias the nodes in each layer of the neural networks, such that the weights determine the strength of the nodes and the biases determine the thresholds for the activation functions of each node. The model parameters 1422, in conjunction with the activation functions of the nodes, determine how input data is transformed into desired outputs. The model parameters 1422 can be determined and/or altered during training of the algorithm 1416.

The loss function engine 1424 can determine a loss function, which is a metric used to evaluate the AI model's performance during training. For instance, the loss function engine 1424 can measure the difference between the predicted output of the AI model and the actual output of the AI model and is used to guide optimization of the AI model during training to minimize the loss function. The loss function may be presented via the ML framework 1414, such that a user can determine whether to retrain or otherwise alter the algorithm 1416 if the loss function is over a threshold. In some instances, the algorithm 1416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1426 adjusts the model parameters 1422 to minimize the loss function during training of the algorithm 1416. In other words, the optimizer 1426 uses the loss function generated by the loss function engine 1424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1426 used may be determined based on the type of model structure 1420 and the size of data and the computing resources available in the data layer 1402.

The regularization engine 1428 executes regularization operations. Regularization is a technique that prevents over- and under-fitting of the AI model. Overfitting occurs when the algorithm 1416 is overly complex and too adapted to the training data, which can result in poor performance of the AI model. Underfitting occurs when the algorithm 1416 is unable to recognize even basic patterns from the training data such that it cannot perform well on training data or on validation data. The optimizer 1426 can apply one or more regularization techniques to fit the algorithm 1416 to the training data properly, which helps constrain the resulting AI model and improves its ability for generalized application. Examples of regularization techniques include lasso (L1) regularization, ridge (L2) regularization, and elastic (L1 and L2 regularization).

The application layer 1408 describes how the AI system 1400 is used to solve problem or perform tasks. In an example implementation, the application layer 1408 can be communicatively coupled (e.g., display application data, receive user input, and/or the like) to an interactable user interface of the record conversion system 200 of FIG. 2.

Example Transformer for Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a pre-defined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may comprise hundreds of thousands of learned parameters or in the case of a large language model (LLM) may comprise millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 15:
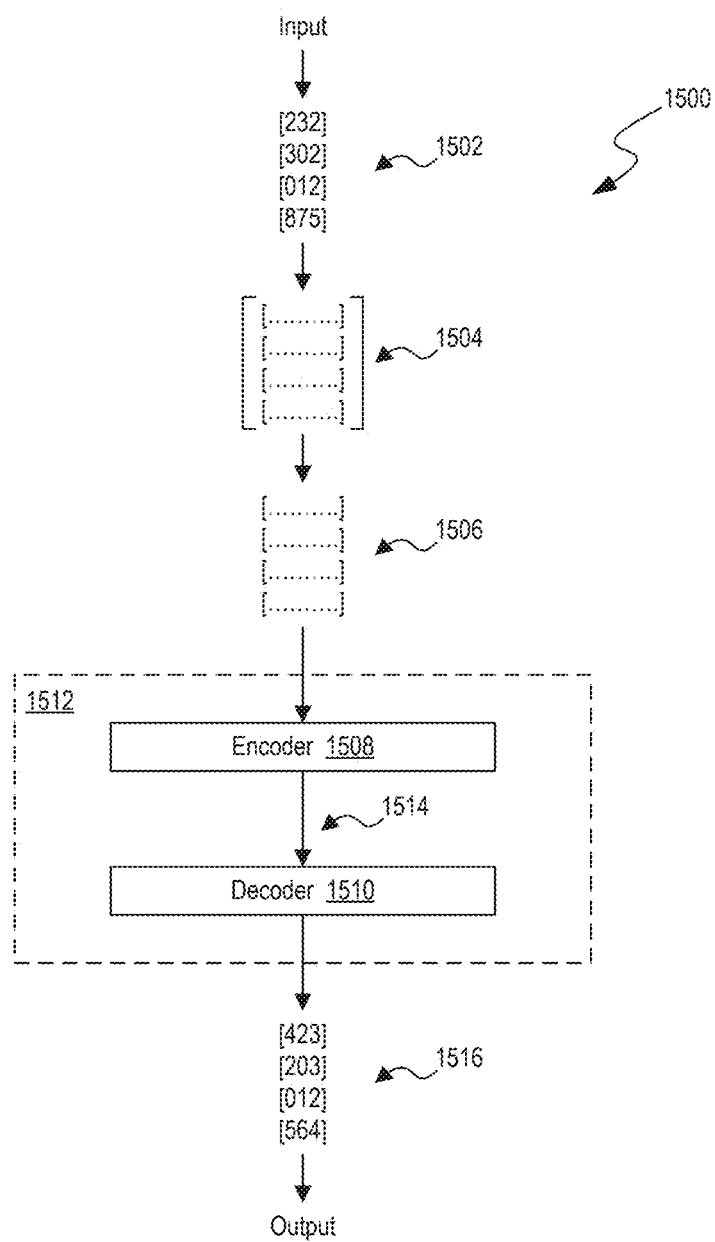
FIG. 15 is a block diagram of an example transformer that can implement aspects of the present technology.

FIG. 15 is a block diagram of an example transformer 1512 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1512 includes an encoder 1508 (which can comprise one or more encoder layers/blocks connected in series) and a decoder 1510 (which can comprise one or more decoder layers/blocks connected in series). Generally, the encoder 1508 and the decoder 1510 each include a plurality of neural network layers, at least one of which can be a self-attention layer. The parameters of the neural network layers can be referred to as the parameters of the language model.

The transformer 1512 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 1512 is trained to perform certain functions on other input formats than natural language input. For example, the input can include objects, images, audio content, or video content, or a combination thereof.

The transformer 1512 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 15 illustrates an example of how the transformer 1512 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 15, a short sequence of tokens 1502 corresponding to the input text is illustrated as input to the transformer 1512. Tokenization of the text sequence into the tokens 1502 can be performed by some pre-processing tokenization module such as, for example, a byte-pair encoding tokenizer (the "pre" referring to the tokenization occurring prior to the processing of the tokenized input by the LLM), which is not shown in FIG. 15 for simplicity. In general, the token sequence that is inputted to the transformer 1512 can be of any length up to a maximum length defined based on the dimensions of the transformer 1512. Each token 1502 in the token sequence is converted into an embedding vector (also referred to simply as an embedding 1506). An embedding 1506 is a learned numerical representation (such as, for example, a vector) of a token that captures some semantic meaning of the text segment represented by the token 1502. The embedding 1506 represents the text segment corresponding to the token 1502 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 1506 corresponding to the "write" token will be closer to another embedding corresponding to the "jot down" token in the vector space as compared to the distance between the embedding 1506 corresponding to the "write" token and another embedding corresponding to the "summary" token.

The vector space can be defined by the dimensions and values of the embedding vectors. Various techniques can be used to convert a token 1502 to an embedding 1506. For example, another trained ML model can be used to convert the token 1502 into an embedding 1506. In particular, another trained ML model can be used to convert the token 1502 into an embedding 1506 in a way that encodes additional information into the embedding 1506 (e.g., a trained ML model can encode positional information about the position of the token 1502 in the text sequence into the embedding 1506). In some examples, the numerical value of the token 1502 can be used to look up the corresponding embedding in an embedding matrix 1504 (which can be learned during training of the transformer 1512).

The generated embeddings 1506 are input into the encoder 1508. The encoder 1508 serves to encode the embeddings 1506 into feature vectors 1514 that represent the latent features of the embeddings 1506. The encoder 1508 can encode positional information (i.e., information about the sequence of the input) in the feature vectors 1514. The feature vectors 1514 can have very high dimensionality (e.g., on the order of thousands or tens of thousands), with each element in a feature vector 1514 corresponding to a respective feature. The numerical weight of each element in a feature vector 1514 represents the importance of the corresponding feature. The space of all possible feature vectors 1514 that can be generated by the encoder 1508 can be referred to as the latent space or feature space.

Conceptually, the decoder 1510 is designed to map the features represented by the feature vectors 1514 into meaningful output, which can depend on the task that was assigned to the transformer 1512. For example, if the transformer 1512 is used for a translation task, the decoder 1510 can map the feature vectors 1514 into text output in a target language different from the language of the original tokens 1502. Generally, in a generative language model, the decoder 1510 serves to decode the feature vectors 1514 into a sequence of tokens. The decoder 1510 can generate output tokens 1516 one by one. Each output token 1516 can be fed back as input to the decoder 1510 in order to generate the next output token 1516. By feeding back the generated output and applying self-attention, the decoder 1510 is able to generate a sequence of output tokens 1516 that has sequential meaning (e.g., the resulting output text sequence is understandable as a sentence and obeys grammatical rules). The decoder 1510 can generate output tokens 1516 until a special [EOT] token (indicating the end of the text) is generated. The resulting sequence of output tokens 1516 can then be converted to a text sequence in post-processing. For example, each output token 1516 can be an integer number that corresponds to a vocabulary index. By looking up the text segment using the vocabulary index, the text segment corresponding to each output token 1516 can be retrieved, the text segments can be concatenated together, and the final output text sequence can be obtained.

In some examples, the input provided to the transformer 1512 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/ cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 16:
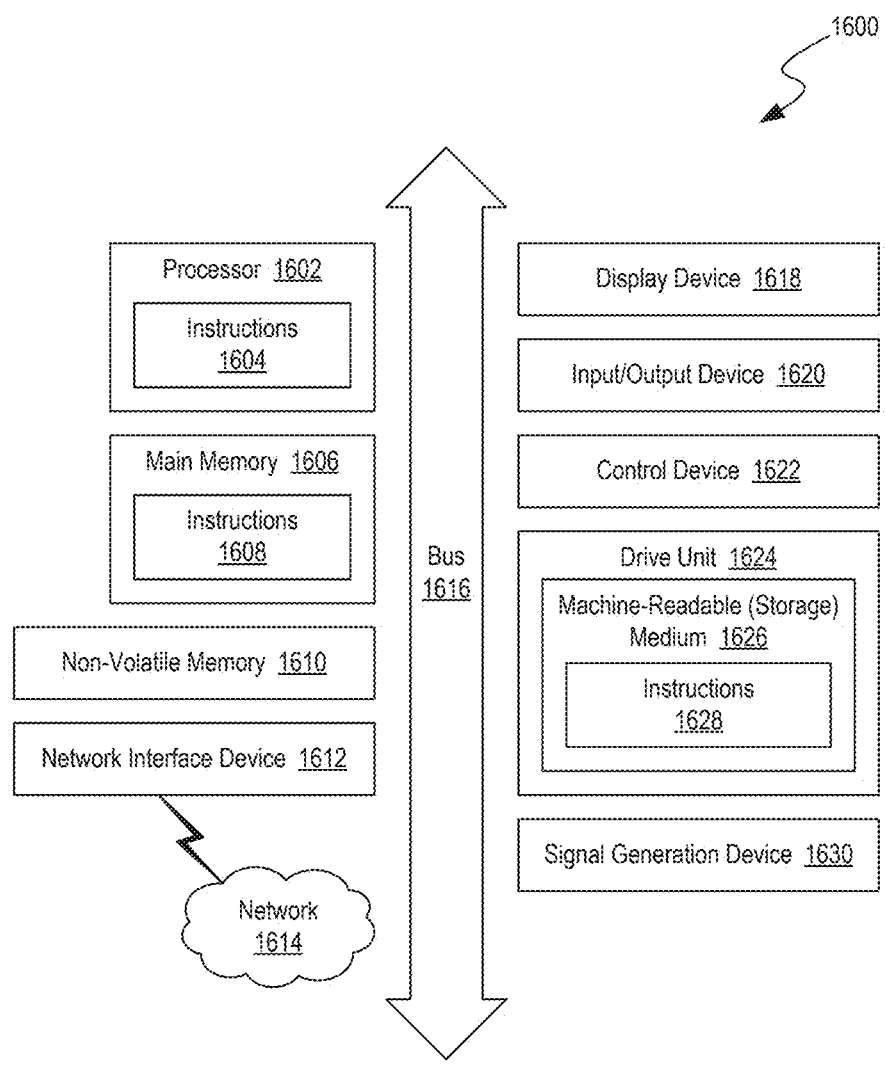
FIG. 16 is a block diagram that illustrates an example of a computer system in which at least some operations described herein can be implemented.

FIG. 16 is a block diagram that illustrates an example of a computer system 1600 in which at least some operations described herein can be implemented. As shown, the computer system 1600 can include: one or more processors 1602, main memory 1606, non-volatile memory 1610, a network interface device 1612, a video display device 1618, an input/output device 1620, a control device 1622 (e.g., keyboard and pointing device), a drive unit 1624 that includes a machine-readable (storage) medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the figures and any other components described in this specification can be implemented.

The computer system 1600 can take any suitable physical form. For example, the computing system 1600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1600. In some implementations, the computer system 1600 can be an embedded computer system, a system-on-chip (SOC), a single-board computer system (SBC), or a distributed system such as a mesh of computer systems, or it can include one or more cloud components in one or more networks. Where appropriate, one or more computer systems 1600 can perform operations in real time, in near real time, or in batch mode.

The network interface device 1612 enables the computing system 1600 to mediate data in a network 1614 with an entity that is external to the computing system 1600 through any communication protocol supported by the computing system 1600 and the external entity. Examples of the network interface device 1612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/ or associated caches and servers) that store one or more sets of instructions 1628. The machine-readable medium 1626 can include any medium that is capable of storing, encoding, or carrying a set of instructions for execution by the computing system 1600. The machine-readable medium 1626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1604, 1608, 1628) set at various times in various memory and storage devices in computing device(s). When read and executed by the processor 1602, the instruction(s) cause the computing system 1600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a system, cause the system to:
retrieve a first time-enumerated data structure storing a first event entry set approximated based on alphanumeric records of a monitored digital communication transmitted among two or more users, each first event entry comprising a normalized event attribute set corresponding to an alphanumeric signal data subset of the alphanumeric records;
retrieve a second time-enumerated data structure storing a second event entry set based on the alphanumeric records of the monitored digital communication, each second event entry comprising a complementary reference event attribute set for the normalized event attribute sets of the first event entry set;
access a model map that links event attribute categories of the first and the second time-enumerated data structures to generative artificial intelligence (AI) models trained to evaluate content similarity for complementary event attribute values associated with the linked event attribute categories; and
for each select first event entry within the first time-enumerated data structure:
identify an event attribute category set for the normalized event attribute set of the select first event entry,
determine, using the model map, one or more generative AI models trained to evaluate content similarity for complementary event attribute values associated with the identified event attribute category set for the select first event entry,
input the normalized event attribute set of the first event entry and the complementary reference event attribute sets of the second event entry set into the one or more generative AI models to output a similarity matrix set,
wherein each similarity matrix comprises a similarity score set that compares content similarities between complementary event attribute values of the select first event entry and a second event entry within the second time-enumerated data structure,
identify, from the second event entry set, a matching second event entry for the select first event entry, the matching second event entry corresponding to the similarity matrix with the similarity score set that satisfies a similarity threshold,
calculate, via comparison of the complementary event attribute values between the select first event entry and the matching second event entry, at least one key performance metric indicating content accuracy of the select first event entry, and
when the at least one key performance metric fails to satisfy a tolerance threshold, automatically retrain, using the second event entry set, a generative AI model used to approximate the select first event entry set of the first time-enumerated data structure.

2. The non-transitory, computer-readable storage medium of claim 1, wherein the instructions further cause the system to:
determine a first timestamp associated with the normalized event attribute set of the select first event entry;
selectively identify, from the second time-enumerated data structure, a second event entry subset comprising second event entries with complementary reference event attribute sets that correspond to timestamps within a time threshold of the first timestamp; and
input the normalized event attribute set of the select first event entry and the complementary reference event attribute sets of the second event entry subset into the one or more generative AI models to output the similarity matrix set.

3. The non-transitory, computer-readable storage medium of claim 1, wherein the instructions further cause the system to:
update the first time-enumerated data structure by removing event entries that comprise normalized event attribute sets with at least one invalid event attribute.

4. The non-transitory, computer-readable storage medium of claim 1, wherein the instructions further cause the system to:
when the at least one key performance metric fails to satisfy the tolerance threshold, transmit for display, at a user interface of the two or more users, an alert indicating detection of invalid event entries within the first time-enumerated data structure.

5. The non-transitory, computer-readable storage medium of claim 1, wherein the instructions further cause the system to:
input the normalized event attribute set and the corresponding alphanumeric signal data subset of the select first event entry into a second generative AI model to determine the event attribute category set for the select first event entry.

6. The non-transitory, computer-readable storage medium of claim 1, wherein the complementary reference event attribute sets for the second event entries of the second time-enumerated data structure originates from user generated content for validating the first time-enumerated data structure.

7. The non-transitory, computer-readable storage medium of claim 1, wherein the first time-enumerated data structure comprises a tabular matrix, wherein the tabular matrix comprises a column-wise data series corresponding to the normalized event attribute set, wherein the tabular matrix comprises a row-wise data series corresponding to the one or more event entries, and wherein each cell of the tabular matrix represents a select event attribute value of a select event entry within the time-enumerated data structure.

8. The non-transitory, computer-readable storage medium of claim 1, wherein the matching second event entry for the select first event entry is identified, in part, by applying Hungarian, or Kuhn-Munkres, algorithm onto the generated similarity matrix for the select first event entry and the second event entries of the second time-enumerated data structure.

9. The non-transitory, computer-readable storage medium of claim 1, wherein the normalized event attribute set comprises an event identifier, a user identifier, an event action type, an event action value, an item identifier, an item value, or a combination thereof.

10. The non-transitory, computer-readable storage medium of claim 1, wherein the event attribute category set for the normalized event attribute set of the select first event entry can comprise an event attribute category representative of semantic alphanumeric signal data.

11. A system comprising:
at least one hardware processor; and
at least one non-transitory memory storing instructions, which, when executed by the at least one hardware processor, cause the system to:
retrieve a first time-enumerated data structure storing a first event entry set approximated based on alphanumeric records of a monitored digital communication transmitted among two or more users, each first event entry comprising a normalized event attribute set corresponding to an alphanumeric signal data subset of the alphanumeric records;
retrieve a second time-enumerated data structure storing a second event entry set based on the alphanumeric records of the monitored digital communication, each second event entry comprising a complementary reference event attribute set for the normalized event attribute sets of the first event entry set; and
for each select first event entry within the first time-enumerated data structure:
determine one or more generative AI models trained to evaluate content similarity for complementary event attribute values associated with an event attribute category set corresponding to the select first event entry,
input the normalized event attribute set of the select first event entry and the complementary reference event attribute sets of the second event entry set into the one or more generative AI models to output a similarity matrix set,
wherein each similarity matrix comprises a similarity score set that compares content similarities between complementary event attribute values of the select first event entry and a second event entry within the second time-enumerated data structure,
calculate, via comparison of the complementary event attribute values between the select first event entry and a matching second event entry for the select first event entry, at least one key performance metric indicating content accuracy of the select first event entry,
wherein the matching second event entry corresponding to the similarity matrix with the similarity score set that satisfies a similarity threshold, and
when the at least one key performance metric fails to satisfy a tolerance threshold, automatically retrain, using the second event entry set, a generative AI model used to approximate the select first event entry set of the first time-enumerated data structure.

12. The system of claim 11 further caused to:
determine a first timestamp associated with the normalized event attribute set of the select first event entry;
selectively identify, from the second time-enumerated data structure, a second event entry subset comprising second event entries with complementary reference event attribute sets that correspond to timestamps within a time threshold of the first timestamp; and
input the normalized event attribute set of the select first event entry and the complementary reference event attribute sets of the second event entry subset into the one or more generative AI models to output the similarity matrix set.

13. The system of claim 11 further caused to:
update the first time-enumerated data structure by removing event entries that comprise normalized event attribute sets with at least one invalid event attribute.

14. The system of claim 11 further caused to:
when the at least one key performance metric fails to satisfy the tolerance threshold, transmit for display, at a user interface of the two or more users, an alert indicating detection of invalid event entries within the first time-enumerated data structure.

15. The system of claim 11 further caused to:
input the normalized event attribute set and the corresponding alphanumeric signal data subset of the select first event entry into a second generative AI model to determine the event attribute category set for the select first event entry.

16. A computer-implemented method comprising:
retrieving a first time-enumerated data structure storing at least one first event entry approximated based on alphanumeric records of a monitored digital communication transmitted among two or more users, the at least one first event entry comprising a normalized event attribute set corresponding to an alphanumeric signal data subset of the alphanumeric records;
retrieving a second time-enumerated data structure storing a second event entry set based on the alphanumeric records of the monitored digital communication, each second event entry comprising a complementary reference event attribute set for the normalized event attribute sets of the first event entry set;
determining one or more generative AI models trained to evaluate content similarity for complementary event attribute values associated with an event attribute category set corresponding to the at least one first event entry;
inputting the normalized event attribute set of the at least one first event entry and the complementary reference event attribute sets of the second event entry set into the one or more generative AI models to output a similarity matrix set;
calculating, via comparison of the complementary event attribute values between the at least one first event entry and a matching second event entry for the at least one first event entry, at least one key performance metric indicating content accuracy of the at least one first event entry, the matching second event entry corresponding to a similarity matrix that satisfies a similarity threshold, and
when the at least one key performance metric fails to satisfy a tolerance threshold, automatically retraining, using the second event entry set, a generative AI model used to approximate the at least one first event entry set of the first time-enumerated data structure.

17. The computer-implemented method of claim 16 further comprising:
determining a first timestamp associated with the normalized event attribute set of the at least one first event entry;
selectively identifying, from the second time-enumerated data structure, a second event entry subset comprising second event entries with complementary reference event attribute sets that correspond to timestamps within a time threshold of the first timestamp; and
inputting the normalized event attribute set of the at least one first event entry and the complementary reference event attribute sets of the second event entry subset into the one or more generative AI models to output the similarity matrix set.

18. The computer-implemented method of claim 16 further comprising:
updating the first time-enumerated data structure by removing event entries that comprise normalized event attribute sets with at least one invalid event attribute.

19. The computer-implemented method of claim 16 further comprising:
when the at least one key performance metric fails to satisfy the tolerance threshold, transmitting for display, at a user interface of the two or more users, an alert indicating detection of invalid event entries within the first time-enumerated data structure.

20. The computer-implemented method of claim 16 further comprising:
inputting the normalized event attribute set and the corresponding alphanumeric signal data subset of the at least one first event entry into a second generative AI model to determine the event attribute category set for the at least one first event entry.

* * * * *